(12) United States Patent
Kawata et al.

(10) Patent No.: US 12,371,758 B2
(45) Date of Patent: Jul. 29, 2025

(54) STEEL SHEET AND METHOD OF MANUFACTURING THE SAME

(71) Applicant: NIPPON STEEL CORPORATION, Tokyo (JP)

(72) Inventors: Hiroyuki Kawata, Tokyo (JP); Kengo Takeda, Tokyo (JP); Katsuya Nakano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 424 days.

(21) Appl. No.: 17/785,367

(22) PCT Filed: Dec. 21, 2020

(86) PCT No.: PCT/JP2020/047738
§ 371 (c)(1),
(2) Date: Jun. 14, 2022

(87) PCT Pub. No.: WO2021/140901
PCT Pub. Date: Jul. 15, 2021

(65) Prior Publication Data
US 2023/0041513 A1 Feb. 9, 2023

(30) Foreign Application Priority Data
Jan. 8, 2020 (JP) ................................ 2020-001530

(51) Int. Cl.
| | |
|---|---|
| *C21D 9/46* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/10* | (2006.01) |
| *C23C 2/02* | (2006.01) |
| *C23C 2/06* | (2006.01) |
| *C23C 2/28* | (2006.01) |
| *C23C 2/40* | (2006.01) |

(52) U.S. Cl.
CPC ............. *C21D 9/46* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C23C 2/02* (2013.01); *C23C 2/0224* (2022.08); *C23C 2/06* (2013.01); *C23C 2/28* (2013.01); *C23C 2/40* (2013.01); *C21D 2211/001* (2013.01); *C21D 2211/005* (2013.01); *C21D 2211/008* (2013.01)

(58) Field of Classification Search
CPC ...... C21D 9/46; C21D 8/0226; C21D 8/0236; C21D 8/0263; C21D 8/0273; C21D 2211/001; C21D 2211/005; C21D 2211/008; C21D 1/19; C21D 1/26; C21D 8/0205; C21D 8/0289; C22C 38/001; C22C 38/002; C22C 38/02; C22C 38/04; C22C 38/06; C22C 38/005; C22C 38/008; C22C 38/08; C22C 38/12; C22C 38/14; C22C 38/16; C22C 38/18; C22C 38/38; C22C 38/40; C22C 38/58; C22C 38/60; C22C 38/42; C22C 38/44; C22C 38/46; C23C 2/02; C23C 2/0224; C23C 2/06; C23C 2/28; C23C 2/40; C23C 2/022; C23C 2/26; B32B 15/013
See application file for complete search history.

(56) References Cited

U.S. PATENT DOCUMENTS

| | | |
|---|---|---|
| 2011/0030854 A1 | 2/2011 | Matsuda et al. |
| 2014/0170440 A1 | 6/2014 | Kawata et al. |
| 2014/0234655 A1 | 8/2014 | Takashima et al. |
| 2014/0287263 A1 | 9/2014 | Kawata et al. |
| 2019/0161823 A1 | 5/2019 | Kohsaka et al. |
| 2021/0062285 A1 | 3/2021 | Kim |
| 2021/0108282 A1 | 4/2021 | Kawasaki et al. |

FOREIGN PATENT DOCUMENTS

| | | |
|---|---|---|
| BR | 112014001589-9 A2 | 2/2017 |
| JP | 5659929 B2 | 1/2015 |
| KR | 10-2014-0050750 A | 4/2014 |
| KR | 10-2014-0068198 A | 6/2014 |
| WO | WO 2009/096596 A1 | 8/2009 |
| WO | WO 2018/030503 A1 | 2/2018 |
| WO | WO 2019/132465 A1 | 7/2019 |
| WO | WO 2019/188643 A1 | 10/2019 |

*Primary Examiner* — Anthony M Liang
*Assistant Examiner* — Danny N Kang
(74) *Attorney, Agent, or Firm* — Birch, Stewart, Kolasch & Birch, LLP

(57) ABSTRACT

A steel sheet includes a predetermined composition, in which a microstructure at a ¼ thickness position from a surface in a sheet thickness direction includes, by vol %, ferrite: 80% or more, martensite: 2% or less, and residual austenite: 2% or less, a proportion of unrecrystallized ferrite in the ferrite of 5% or less, and in the microstructure of the steel sheet stretched by 10% at the ¼ thickness position from the surface in the sheet thickness direction, a number density of voids having a maximum diameter of 1.0 μm or more is $1.0 \times 10^9$ pieces/m$^2$ or less.

6 Claims, No Drawings

STEEL SHEET AND METHOD OF MANUFACTURING THE SAME

TECHNICAL FIELD OF THE INVENTION

The present invention relates to a steel sheet and a method for manufacturing the same.

Priority is claimed on Japanese Patent Application No. 2020-001530, filed on Jan. 8, 2020, the content of which is incorporated herein by reference.

BACKGROUND ART

Recently, in vehicles, in order to reduce the weight of a vehicle body for a reduction in fuel consumption, to reduce the emissions of carbon dioxide gas, or to absorb collision energy during collision for ensuring the protection and safety of passengers, high strength steel sheets are widely used. However, in general, in a case where a steel sheet is high-strengthened, deformability (for example, ductility or bendability) deteriorates, and fracture is likely to occur in a locally large strain region generated in impact deformation. Therefore, in a steel sheet used in a vehicle, excellent properties in which fracture is not likely to occur, that is, resistance to impact and fracture is required for the locally large strain region generated in impact deformation.

For example, Patent Document 1 discloses a high strength steel sheet having a tensile strength of 900 MPa or higher where high strength and excellent formability can be simultaneously achieved. In Patent Document 1, a steel structure includes, by area ratio, 5% or more and 80% or less of ferrite, 15% or more of autotempered martensite, 10% or less of bainite, 5% or less of residual austenite, and 40% or less of as-quenched martensite; an average hardness of the autotempered martensite is $HV \leq 700$; and the average number of precipitated iron-based carbide grains each having a size of 5 nm or more and 0.5 µm or less in the autotempered martensite is $5 \times 10^4$ or more per 1 $mm^2$.

Patent Document 2 discloses a steel sheet having a tensile strength of 900 MPa or higher, excellent weldability, and excellent elongation. The steel sheet in Patent Document 2 includes, as a steel structure, by area ratio, 25% or more and 65% or less of ferrite, 35% or more and 75% or less of martensite having iron-based carbides precipitated in the martensite grains, and 20% or less (including 0%) in total of the remainder in microstructure other than the ferrite and the martensite, in which an average grain size of each of the ferrite and the martensite is 5 µm or less, and a total atomic concentration of Si and Mn at an interface between the ferrite and the martensite is 5% or more.

Patent Document 3 discloses a cold-rolled steel sheet including, as a steel structure, 60 area % or more in total of ferrite and bainite and 3 area % or more and 20 area % or less of residual austenite, in which an average grain size of the ferrite and the bainite is 0.5 µm or more and 6.0 µm or less, a C concentration in the residual austenite is 0.5 mass % or more and 1.2 mass % or less, the cold-rolled steel sheet has an element concentration distribution in which an average interval in an orthogonal-to-rolling direction of each of a Mn concentrated portion and a Si concentrated portion that extend in a rolling direction at a 50 µm depth position from a steel sheet surface is 1000 µm or less, the cold-rolled steel sheet has surface properties in which a maximum depth of cracks on the steel sheet surface is 4.5 µm or less and a number density of cracks having a width of 6 µm or less and a depth of 2 µm or more is 10 crack/50 µm or more, and the cold-rolled steel sheet has mechanical properties in which a tensile strength (TS) is 800 MPa or higher and 1200 MPa or lower, a work hardening coefficient (n3-8) in a plastic strain region of 3% or more and 8% or less is 0.10 or more, and bendability satisfies an expression ($R/t \leq 1.5$).

However, as a result of an investigation by the present inventors, it was found that resistance to impact and fracture is not sufficient with the techniques disclosed in Patent Documents 1 to 3.

PRIOR ART DOCUMENT

Patent Document

[Patent Document 1] PCT International Publication No. WO2009/096596
[Patent Document 2] PCT International Publication No. WO2018/030503
[Patent Document 3] Japanese Patent No. 5659929

DISCLOSURE OF THE INVENTION

Problems to be Solved by the Invention

The present invention has been considering that not only improvement of formability and strength but also improvement of resistance to impact and fracture are required for a high strength steel sheet as described above. An object of the present invention is to provide a high strength steel sheet (including a galvanized steel sheet, a zinc alloy plated steel sheet, a galvannealed steel sheet, and an alloy galvannealed steel sheet) having excellent formability, strength, and resistance to impact and fracture and a method of manufacturing the same.

Means for Solving the Problem

As a result of an investigation in order to achieve the object, the present inventors achieved findings.

(a) Fine voids formed in the steel by forming are paths where brittle and ductile fracture occurring during impact propagates. Therefore, a reduction in the volume percentage of a hard structure (martensite and residual austenite) as an origin where fine voids initiate is effective for improving resistance to impact and fracture.

(b) Voids formed in the vicinity of hard cementite by cold rolling or voids formed by cold rolling when a hot-rolled steel sheet has high hardness by solid solution carbon appear to disappear by a heat treatment (annealing). However, fine voids formed during forming remain in the product. Therefore, the control of a distribution of cementite and solid solution carbon before cold rolling is effective for improving resistance to impact and fracture.

The present invention has been made based on the above findings, and the scope thereof is as follows.

[1] According to one aspect of the present invention, there is provided a steel sheet including, as a composition, by mass %:

C: 0.010% to 0.200%;
Si: 0.005% to 1.500%;
Mn: 0.05% to 3.00%;
Al: 0.005% to 1.000%;
P: 0.100% or less;
S: 0.0200% or less;
N: 0.0150% or less;
O: 0.0100% or less;

Nb: 0% to 0.060%;
Ti: 0% to 0.100%;
V: 0% to 0.500%;
Cr: 0% to 1.00%;
Ni: 0% to 1.00%;
Cu: 0% to 1.00%;
Mo: 0% to 1.00%;
W: 0% to 1.000%;
B: 0% to 0.0100%;
Sn: 0% to 1.00%;
Sb: 0% to 0.20%;
one or two or more selected from the group consisting of Ca, Ce, Mg, Zr, La, and REM: 0% to 0.0100% in total; and
a remainder including Fe and impurities,
in which a microstructure at a ¼ thickness position from a surface in a sheet thickness direction includes, by vol %, ferrite: 80% or more, martensite: 2% or less, and residual austenite: 2% or less,
has a proportion of unrecrystallized ferrite in the ferrite of 5% or less, and
in the microstructure of the steel sheet stretched by 10% at the ¼ thickness position from the surface in the sheet thickness direction, a number density of voids having a maximum diameter of 1.0 µm or more is $1.0 \times 10^9$ pieces/m² or less.

[2] In the steel sheet according to [1], the composition may further include, by mass %, one or two or more selected from the group consisting of:
Nb: 0.005% to 0.060%;
Ti: 0.015% to 0.100%;
V: 0.010% to 0.500%;
Cr: 0.05% to 1.00%;
Ni: 0.05% to 1.00%;
Cu: 0.05% to 1.00%;
Mo: 0.03% to 1.00%;
W: 0.030% to 1.000%;
B: 0.0005% to 0.0100%;
Sn: 0.01% to 1.00%;
Sb: 0.005% to 0.20%; and
one or two or more selected from the group consisting of Ca, Ce, Mg, Zr, La, and REM: 0.0001% to 0.0100% in total.

[3] In the steel sheet according to [1] or [2], an average grain size of the ferrite in the microstructure may be 6.0 µm to 15.0 µm.

[4] The steel sheet according to any one of [1] to [3] may further include a galvanized layer on the surface.

[5] The steel sheet according to any one of [1] to [3] may include a zinc alloy plated layer on the surface.

[6] In the steel sheet according to [4] or [5], a Fe content in the galvanized layer or the zinc alloy plated layer may be 7.0% to 13.0% by mass %.

[7] According to another aspect of the present invention, there is provided a method of manufacturing the steel sheet according to any one of [1] to [3], including: a hot rolling process of heating a steel piece having the composition according to [1] to 1150° C. to 1320° C., completing hot rolling such that a hot rolling completion temperature is 850° C. to 930° C., starting cooling after 1.5 s or longer, and cooling the steel piece to a temperature range of 500° C. or lower to obtain a hot-rolled steel sheet such that an average cooling rate in a temperature range of a cooling start temperature to 500° C. is 20° C./s or faster;

a reheating process of heating the hot-rolled steel sheet to a temperature range of 500° C. to 700° C.;
a cooling process of cooling the hot-rolled steel sheet to room temperature;
a cold rolling process of cold-rolling the hot-rolled steel sheet to obtain a cold-rolled steel sheet such that a total rolling reduction is 30% to 90% and a cold rolling completion temperature is 120° C. to 250° C.; and
an annealing process of heating the cold-rolled steel sheet to an annealing temperature of 720° C. to 850° C. and cooling to a temperature range of 500° C. or lower,
in which in the hot rolling process,
Expression (1) is satisfied in a temperature range of 1000° C. or lower,
in the reheating process,
Expression (2) is satisfied in the temperature range of 500° C. to 700° C.,
in the annealing process,
a tension of 20 MPa or higher is applied and Expression (3) is satisfied in a temperature range of 720° C. to the annealing temperature during heating to the annealing temperature, and
Expression (4) is satisfied in a temperature range of 720° C. to 500° C. during cooling from the annealing temperature, $$D_0 = 10^{(a_1 \cdot T_i^2 + a_2 \cdot T_i + a_3)} \quad \text{Expression (1)}$$

$$p_i = a_8 \cdot \exp\left(\frac{a_9}{T_i + 273}\right)$$

$$q_i = a_{10} \cdot \exp\left(\frac{a_{11}}{T_i + 273}\right)$$

$$D_i = D_{i-1} \cdot \frac{h_i}{2h_{i-1}} \cdot \exp\left(a_4 \cdot \left(\frac{t_i}{p_i}\right)^{a_5}\right)$$

$$+ 10^{(a_1 \cdot T_i^2 + a_2 \cdot T_i + a_3)} \cdot \frac{h_{i-1} - h_i}{2h_{i-1}} \cdot \left\{1 - \exp\left(a_4 \cdot \left(\frac{t_i}{p_i}\right)^{a_5}\right) + \exp\left(a_6 \cdot \left(\frac{t_i}{q_i}\right)^{a_7}\right)\right\}$$

$$+ 10^{(a_1 \cdot T_i^2 + a_2 \cdot T_i + a_3)} \cdot \frac{1}{2} \cdot \left\{1 - \exp\left(a_6 \cdot \left(\frac{t_i}{q_i}\right)^{a_7}\right)\right\} \quad D_n \leq 12.5$$

in Expression (1), $D_n$ represents an index representing a degree of progress of precipitation of a fine carbide in a temperature range of 1000° C. or lower of the hot rolling process, and
reference numerals in Expression (1) are as follows,
n: the number of rolling passes in the temperature range of 1000° C. or lower,
$T_i$: a rolling temperature in an i-th pass rolling,
$t_i$: an elapsed time [s] from the i-th pass rolling to an i+1-th pass rolling or an elapsed time [s] taken until a steel sheet temperature decreases to 850° C. from the i-th pass rolling,
$h_{i-1}$: a sheet thickness [mm] before the i-th pass rolling in the temperature range of 1000° C. or lower,
$h_i$: a sheet thickness [mm] after the i-th pass rolling in the temperature range of 1000° C. or lower, and $a_{1 \text{ to } 11}$: constants  Expression (2)

$(a_1 = 2.54 \times 10^{-6}, a_2 = 3.62 \times 10^{-4}, a_3 = -6.38 \times 10^{-1},$ $a_4 = -3.00 \times 10^{-1}, a_5 = 8.50 \times 10^{-1}, a_6 = -8.50 \times 10^{-4},$ $a_7 = 2.40 \times 10^0, a_8 = 7.83 \times 10^{-13}, a_9 = 2.80 \times 10^5,$ $a_{10} = 6.00 \times 10^{-12}, \text{ and } a_{11} = 2.80 \times 10^5),$ -continued $$t_n = 10^{\frac{T_{n-1}+273}{T_n+273}\log_{10}t_{n-1}-\left(1-\frac{T_{n-1}+273}{T_n+273}\right)\cdot 20\cdot(1+0.08Si)} + \Delta t_K$$

$$K_n = (T_n + 273) \cdot \{\log_{10}t_n + 20 \cdot (1 + 0.08Si)\}$$

$$K_{20} \geq 1.50 \times 10^4$$

in Expression (2), $K_{20}$ represents an index representing a degree of progress of precipitation of the fine carbide in a 20th period when a temperature history in the temperature range of 500° C. to 700° C. of the reheating process is divided into 20 periods with respect to time, and reference numerals in Expression (2) are as follows, $T_n$: an average temperature [° C.] in an n-th period when a temperature history in the temperature range of 500° C. to 700° C. is divided into 20 periods with respect to time, $\Delta t_K$: a time [hr.] in one of 20 periods into which a total residence time in the temperature range of 500° C. to 700° C. is divided, where $t_1 = \Delta t_K$, and Si: a Si content [mass %], $$1.0 \leq \sum_{i=1}^{10} \frac{d_1}{K_{20}} \cdot \exp\left(\frac{d_2}{T_i}\right) \cdot t'^{0.5} \leq 20.0 \quad \text{Expression (3)}$$

reference numerals in Expression (3) are as follows, $K_{20}$: a value obtained by Expression (2), $d_1$ and $d_2$: constants ($d_1 = 9.67 \times 10^{10}$ and $d_2 = 1.25 \times 10^4$), $T_i$: an average heat treatment temperature [° C.] in an i-th period when a temperature history in the temperature range of 720° C. to the annealing temperature is divided into 10 periods with respect to time, and t': 1/10 [s] of a residence time in the temperature range of 720° C. to the annealing temperature, $$\sum_{i=1}^{10}(g_1 + g_2 \cdot Nb^{0.5} + g_3 \cdot Ti*^{0.5}) \cdot (1 + g_4 \cdot Mo^{0.5})^{-1} \cdot \quad \text{Expression (4)}$$

$$\left(\frac{A_{c3} - T_{max}}{A_{c3} - A_{c1}}\right)^{-1/3} \cdot (\Delta_i + g_5 \cdot \Delta_i^{0.5}) \cdot \exp\left(-\frac{g_6}{T_i + 273}\right) \cdot t'^{0.5} \geq 1.0$$

reference numerals in Expression (4) are as follows, $\Delta_i$: 750−18×Si−17×Mn−10×Cr−8×Ni+15×Al−$T_i$, where each of the elements represents a content by mass % of the element, and when the element is not included, 0 is substituted as the content of the element, when a calculated value of $\Delta_i$ is a negative value, $\Delta_i$ is set to 0, $g_{1\text{ to }6}$: constants ($g_1 = 1.00 \times 10^{-1}$, $g_2 = 1.46 \times 10^{-1}$, $g_3 = 1.14 \times 10^{-1}$, $g_4 = 2.24 \times 10^0$, $g_5 = 4.53 \times 10^0$, and $g_6 = 4.83 \times 10^3$), Nb, Mo, Si, Mn, Cr, Ni, and Al: a content [mass %] of each of the elements, where when the element is not included, 0 is substituted as the content of the element, Ti*: an effective Ti content represented by Ti−42/14×N, where Ti and N represent a content [mass %] of each of the elements, when the element is not included, 0 is substituted as the content of the element, a minimum value is set to 0, $T_i$: an average heat treatment temperature [° C.] in an i-th period when a temperature history in the temperature range of 720° C. to 500° C. is divided into 10 periods with respect to time, $Ac_1$ and $Ac_3$: a transformation start temperature and a transformation completion temperature [° C.] during heating, $T_{max}$: a highest heating temperature [C] in a heat treatment process, and t': 1/10 [s] of a residence time in the temperature range of 720° C. to 500° C.

[8] In the method of manufacturing a steel sheet according to [7], during cooling in the annealing process, hot-dip galvanizing may be performed on the cold-rolled steel sheet.

[9] In the method of manufacturing a steel sheet according to [7], during cooling in the annealing process, hot-dip zinc alloy plating may be performed on the cold-rolled steel sheet.

[10] In the method of manufacturing a steel sheet according to [8] or [9], during cooling in the annealing process, alloying may be performed after the hot-dip galvanizing or the hot-dip zinc alloy plating.

Effects of the Invention

In the above-described aspects according to the present invention, a steel sheet having excellent formability, strength, and resistance to impact and fracture and a method of manufacturing the same can be provided.

Embodiments of the Invention

Hereinafter, a steel sheet according to an embodiment and manufacturing conditions thereof will be sequentially described. First, the reason for limiting a composition (chemical composition) of the steel sheet according to the embodiment will be described. A limited numerical range described below with "~" interposed therebetween includes a lower limit value and an upper limit value. A numerical value shown together with "less than" or "more than" is not included in a numerical range. All the "%" in the composition represents "mass %".

A steel sheet according to the embodiment includes, as a composition, by mass %: C: 0.010% to 0.200%; Si: 0.005% to 1.500%; Mn: 0.05% to 3.00%; Al: 0.005% to 1.000%; P: 0.100% or less; S: 0.0200% or less; N: 0.0150% or less; O: 0.0100% or less; Nb: 0% to 0.060%; $T_i$: 0% to 0.100%; V: 0% to 0.500%; Cr: 0% to 1.00%; Ni: 0% to 1.00%; Cu: 0% to 1.00%; Mo: 0% to 1.00%; W: 0% to 1.000%; B: 0% to 0.0100%; Sn: 0% to 1.00%; Sb: 0% to 0.20%; one or two or more selected from the group consisting of Ca, Ce, Mg, Zr, La, and REM: 0% to 0.0100% in total; and a remainder including Fe and impurities. Hereinafter, each of the elements will be described.

C: 0.010% to 0.200%

C is an element that significantly increases the strength of the steel sheet. When the C content is 0.010% or more, a sufficient tensile strength (maximum tensile strength) can be obtained. Therefore, the C content is set to be 0.010% or more. In order to further increase the tensile strength of the steel sheet, the C content is preferably 0.020% or more and more preferably 0.030% or more.

On the other hand, when the C content is 0.200% or less, the amount of ferrite after a heat treatment can be controlled to a desired amount. Therefore, resistance to impact and fracture can be ensured. Therefore, the C content is set to be 0.200% or less. In order to further improve resistance to impact and fracture, the C content is preferably 0.180% or less and more preferably 0.150% or less.

Si: 0.005% to 1.500%

Si is an element that refines an iron-based carbide and contributes to improvement of a balance between the strength and the formability. In order to improve the balance between the strength and the formability, the Si content is set to be 0.005% or more. The Si content is preferably 0.025% or more. In particular, from the viewpoint of increasing the strength, the Si content is more preferably 0.100% or more.

In addition, when the Si content is 1.500% or less, the formation of a coarse Si oxide that functions as a fracture origin can be suppressed, cracking is not likely to occur, the embrittlement of the steel can be suppressed, and resistance to impact and fracture can be ensured. Therefore, the Si content is set to be 1.500% or less. The Si content is preferably 1.300% or less and more preferably 1.000% or less.

Mn: 0.05% to 3.00%

Mn is an element that improves hardenability of the steel and contributes to improvement of the strength. In order to obtain a desired strength, the Mn content is set to be 0.05% or more. The Mn content is preferably 0.15% or more.

In addition, when the Mn content is 3.00% or less, the loss of macroscopic homogeneity in the steel sheet caused by segregation of Mn during casting can be suppressed, the amount of ferrite can be controlled to a desired amount, and the formability of the steel sheet can be secured. Therefore, the Mn content is set to be 3.00% or less. In order to obtain more satisfactory formability, the Mn content is preferably 2.80% or less and more preferably 2.60% or less.

Al: 0.005% to 1.000%

Al is an element which functions as a deoxidation material. When the Al content is 0.005% or more, a deoxidation effect can be sufficiently obtained. Therefore, the Al content is set to be 0.005% or more. The Al content is preferably 0.010% or more and more preferably 0.020% or more.

Al is also an element that forms a coarse oxide as a fracture origin and embrittles the steel. When the Al content is 1.000% or less, the formation of a coarse oxide as a fracture origin can be suppressed, and easy cracking of the steel piece can be suppressed. Therefore, the Al content is set to be 1.000% or less. The Al content is preferably 0.800% or less and more preferably 0.600% or less.

P: 0.100% or Less

P is an element that embrittles the steel and embrittles a molten portion formed by spot welding. When the P content is 0.100% or less, easy cracking of the steel sheet in the formation process caused by embrittlement can be suppressed. Therefore, the P content is set to be 0.100% or less. From the viewpoint of productivity, the P content is preferably 0.050% or less and more preferably 0.030% or less.

The lower limit of the P content may be 0%. By setting the P content to be 0.001% or more, the manufacturing costs can be further suppressed. Therefore, the lower limit of the P content may be set to be 0.001%.

S: 0.0200% or Less

S is an element that forms a Mn sulfide and deteriorates formability such as ductility, hole expansibility, stretch flangeability, or bendability. When the S content is 0.0200 or less, significant deterioration in the formability of the steel sheet can be suppressed. Therefore, the S content is set to be 0.0200% or less. The S content is preferably 0.0100% or less and more preferably 0.0080% or less.

The lower limit of the S content may be 0%. By setting the S content to be 0.0001% or more, the manufacturing costs can be further suppressed. Therefore, the lower limit of the S content may be set to be 0.0001%.

N: 0.0150% or Less

N is an element that forms a nitride and deteriorates formability such as ductility, hole expansibility, stretch flangeability, or bendability. When the N content is 0.0150% or less, deterioration in the formability of the steel sheet can be suppressed. Therefore, the N content is set to be 0.0150% or less. In addition, N is also an element that causes weld defects during welding and hinders productivity. Therefore, the N content is preferably 0.0120% or less and more preferably 0.0100% or less.

The lower limit of the N content may be 0%. By setting the N content to be 0.0005% or more, the manufacturing costs can be further suppressed. Therefore, the lower limit of the N content may be set to be 0.0005%.

O: 0.0100% or Less

O is an element that forms an oxide and hinders formability such as ductility, hole expansibility, stretch flangeability, or bendability. When the O content is 0.0100% or less, significant deterioration in the formability of the steel sheet can be suppressed. Therefore, the O content is set to be 0.0100% or less. The O content is preferably 0.0080% or less and more preferably 0.0050% or less.

The lower limit of the O content may be 0%. By setting the O content to be 0.0001% or more, the manufacturing costs can be further suppressed. Therefore, the lower limit of the O content may be set to be 0.0001%.

The remainder in the composition of the steel sheet according to the embodiment may include Fe and impurities. Examples of the impurities include elements that are unavoidably incorporated from steel raw materials or scrap and/or in the steelmaking process and are allowable within a range where the properties of the steel sheet according to the embodiment are not hindered. Examples of the impurities include H, Na, Cl, Co, Zn, Ga, Ge, As, Se, Tc, Ru, Rh, Pd, Ag, Cd, In, Te, Cs, Ta, Re, Os, Ir, Pt, Au, Pb, Bi, and Po. The total content of the impurities may be 0.100% or less.

The steel sheet according to the embodiment may include elements as optional elements instead of a part of Fe. When the steel sheet does not include the following optional elements, the contents of the elements are 0%.

Nb: 0% to 0.060%

Nb is an element that contributes to improvement of the strength of the steel sheet by strengthening by a precipitate, grain refinement strengthening by growth suppression of ferrite crystal grains, and dislocation strengthening by suppression of recrystallization. Nb does not need to be included. Therefore, the lower limit of the Nb content includes 0%. In order to sufficiently obtain the strength improvement effect by Nb, the Nb content is preferably 0.005% or more and more preferably 0.015% or more.

In addition, when the Nb content is 0.060% or less, the remaining of unrecrystallized ferrite caused by promotion of recrystallization can be suppressed, and the formability of the steel sheet can be ensured. Therefore, the Nb content is set to be 0.060% or less. The Nb content is preferably 0.050% or less and more preferably 0.040% or less.

Ti: 0% to 0.100%

Ti is an element having an effect of reducing the amounts of S, N, and O causing the formation of a coarse inclusion that functions as a fracture origin. In addition, Ti has an effect of refining the structure to improve a balance between the strength and the formability. Nb is an element that contributes to improvement of the strength of the steel sheet by strengthening by a precipitate, grain refinement strengthening by growth suppression of ferrite crystal grains, and dislocation strengthening by suppression of recrystallization. Ti does not need to be included. Therefore, the lower limit of the Ti content includes 0%. In order to sufficiently obtain the effect by Ti, the Ti content is preferably 0.015% or more and more preferably 0.025% or more.

In addition, when the Ti content is 0.100% or less, the formation of a coarse Ti sulfide, a coarse Ti nitride, or a coarse Ti oxide can be suppressed, and the formability of the steel sheet can be ensured. Therefore, the Ti content is set to be 0.100% or less. Therefore, the Ti content is preferably 0.075% or less and more preferably 0.060% or less.

V: 0% to 0.500%

V is an element that contributes to improvement of the strength of the steel sheet by strengthening by a precipitate, grain refinement strengthening by growth suppression of ferrite crystal grains, and dislocation strengthening by suppression of recrystallization. V does not need to be included. Therefore, the lower limit of the V content includes 0%. In order to sufficiently obtain the strength improvement effect by V, the V content is preferably 0.010% or more and more preferably 0.030% or more.

In addition, when the V content is 0.500% or less, deterioration in the formability of the steel sheet caused by precipitation of a large amount of carbonitrides can be suppressed. Therefore, the V content is set to be 0.500% or less.

Cr: 0% to 1.00%

Cr is an element that improves hardenability of the steel and contributes to improvement of the strength of the steel sheet, and is an element that can be replaced with a part of Mn. Cr does not need to be included. Therefore, the lower limit of the Cr content includes 0%. In order to sufficiently obtain the strength improvement effect by Cr, the Cr content is preferably 0.05% or more and more preferably 0.20% or more. In addition, when the Cr content is 1.00% or less, the formation of a coarse Cr carbide that can function as a fracture origin can be suppressed. Therefore, the Cr content is set to be 1.00% or less.

Ni: 0% to 1.00%

Ni is an element that suppresses phase transformation at a high temperature and contributes to improvement of the strength of the steel sheet, and is an element that can be replaced with a part of Mn. Ni does not need to be included. Therefore, the lower limit of the Ni content includes 0%. In order to sufficiently obtain the strength improvement effect by Ni, the Ni content is preferably 0.05% or more and more preferably 0.20% or more.

In addition, when the Ni content is 1.00% or less, deterioration in the weldability of the steel sheet can be suppressed. Therefore, the Ni content is set to be 1.00% or less.

Cu: 0% to 1.00%

Cu is an element that is present in the steel in the form of fine grains and contributes to improvement of the strength of the steel sheet, and is an element that can be replaced with a part of C and/or Mn. Cu does not need to be included. Therefore, the lower limit of the Cu content includes 0%. In order to sufficiently obtain the strength improvement effect by Cu, the Cu content is preferably 0.05% or more and more preferably 0.15% or more.

In addition, when the Cu content is 1.00% or less, deterioration in the weldability of the steel sheet can be suppressed. Therefore, the Cu content is set to be 1.00% or less.

Mo: 0% to 1.00%

Mo is an element that suppresses phase transformation at a high temperature and contributes to improvement of the strength of the steel sheet, or is an element that can be replaced with a part of Mn. Mo does not need to be included. Therefore, the lower limit of the Mo content includes 0%. In order to sufficiently obtain the strength improvement effect by Mo, the Mo content is preferably 0.03% or more and more preferably 0.06% or more.

In addition, when the Mo content is 1.00% or less, deterioration in productivity caused by deterioration in hot workability can be suppressed. Therefore, the Mo content is set to be 1.00% or less.

W: 0% to 1.000%

W is an element that suppresses phase transformation at a high temperature and contributes to improvement of the strength of the steel sheet, or is an element that can be replaced with a part of C and/or Mn. W does not need to be included. Therefore, the lower limit of the W content includes 0%. In order to sufficiently obtain the strength improvement effect by W, the W content is preferably 0.030% or more and more preferably 0.100% or more.

In addition, when the W content is 1.000% or less, deterioration in productivity caused by deterioration in hot workability can be suppressed. Therefore, the W content is set to be 1.000% or less.

B: 0% to 0.0100%

B is an element that suppresses phase transformation at a high temperature and contributes to improvement of the strength of the steel sheet, and is an element that can be replaced with a part of Mn. B does not need to be included. Therefore, the lower limit of the B content includes 0%. In order to sufficiently obtain the strength improvement effect by B, the B content is preferably 0.0005% or more and more preferably 0.0010% or more.

In addition, when the B content is 0.0100% or less, deterioration in the strength of the steel sheet caused by the formation of a B precipitate can be suppressed. Therefore, the B content is set to be 0.0100% or less.

Sn: 0% to 1.00%

Sn is an element that suppresses the coarsening of crystal grains and contributes to improvement of the strength of the steel sheet. Sn does not need to be included. Therefore, the lower limit of the Sn content includes 0%. In order to sufficiently obtain the effect by Sn, the Sn content is more preferably 0.01% or more. In addition, when the Sn content is 1.00% or less, fracture during rolling caused by embrittlement of the steel sheet can be suppressed. Therefore, the Sn content is set to be 1.00% or less.

Sb: 0% to 0.20%

Sb is an element that suppresses the coarsening of crystal grains and contributes to improvement of the strength of the steel sheet. Sb does not need to be included. Therefore, the lower limit of the Sb content includes 0%. In order to sufficiently obtain the effect, the Sb content is preferably 0.005% or more.

In addition, when the Sb content is 0.20% or less, fracture during rolling caused by embrittlement of the steel sheet can be suppressed. Therefore, the Sb content is set to be 0.20% or less.

One or Two or More Selected from Ca, Ce, Mg, Zr, La, and REM: 0% to 0.0100% in Total The composition of the steel sheet according to the embodiment may optionally include one or two or more selected from Ca, Ce, Mg, Zr, La, and REM.

Ca, Ce, Mg, Zr, La, and REM are elements that contribute to improvement of the formability of the steel sheet. The lower limit of the total content of one or two or more selected from Ca, Ce, Mg, Zr, La, and REM includes 0%. In order to sufficiently obtain the formability improvement effect, the total content is preferably 0.0001% or more and more preferably 0.0010% or more.

In addition, when the total content of one or two or more selected from Ca, Ce, Mg, Zr, La, and REM is 0.0100% or less, deterioration in the ductility of the steel sheet can be suppressed. Therefore, the total content of the elements is set to be 0.0100% or less. The total content is preferably 0.0050% or less.

REM (Rare Earth Metal) refers to an element group other than La and Ce that can be individually specified in the element group belonging to lanthanoids. In most cases, these elements are added in the form of mischmetal. However, the lanthanoid-based elements other than La and Ce may be inevitably included.

Next, the microstructure of the steel sheet according to the embodiment will be described.

In the steel sheet according to the embodiment, a microstructure at a ¼ thickness position from a surface in a sheet thickness direction includes, by vol %, ferrite: 80% or more, martensite: 2% or less, and residual austenite: 2% or less, and has a proportion of unrecrystallized ferrite in the ferrite of 5% or less.

In the embodiment, the reason for limiting the microstructures at the ¼ thickness position in the sheet thickness direction from the surface is that the microstructure at the position are representative microstructures of the steel sheet and have a strong correlation with the mechanical properties of the steel sheet. All of the proportions of structures in the microstructure are volume percentages (vol %).

Ferrite: 80% or More

Ferrite is a structure having excellent formability. When the volume percentage of ferrite is 80% or more, desired formability can be obtained. Therefore, the volume percentage of ferrite is set to be 80% or more. The volume percentage of ferrite is preferably 85% or more and more preferably 90% or more. It is preferable that the amount of ferrite is large. Therefore, the volume percentage of ferrite may be 100%.

The ferrite described herein also includes unrecrystallized ferrite.

Proportion of Unrecrystallized Ferrite in Ferrite: 5% or Less

The unrecrystallized ferrite is ferrite where strain introduced by cold rolling or the like remains, and has a higher strength but lower ductility than typical ferrite. Accordingly, in the steel sheet according to the embodiment, the proportion of unrecrystallized ferrite in the ferrite is limited to 5% or less. The proportion of unrecrystallized ferrite in the ferrite is set to be preferably 3% or less and more preferably 1% or less. In order to improve the formability of the steel sheet, it is still more preferable that unrecrystallized ferrite is not included. Therefore, the proportion of unrecrystallized ferrite in the ferrite may be 0%.

Martensite: 2% or Less

The martensite is a structure that increases the strength but functions as an origin where fine voids initiate during forming. When fine voids initiate during forming, desired resistance to impact and fracture cannot be obtained. In order to suppress the formation of fine voids during forming, the volume percentage of martensite is set to be 2% or less. The volume percentage of martensite is preferably 1% or less and more preferably 0%. In the embodiment, the volume percentage of "martensite in MA (region including both of martensite and residual austenite)" includes "the volume percentage of martensite".

Residual Austenite: 2% or Less

Residual austenite is a structure that improves a balance between the strength and the ductility of the steel sheet but functions as an origin where fine voids initiate during forming. In order to suppress the formation of fine voids during forming, the volume percentage of residual austenite is set to be 2% or less. The volume percentage of residual austenite is preferably 1% or less and more preferably 0%.

Remainder in Microstructure: 20% or Less

Examples of the remainder in the microstructure include pearlite and bainite. By setting the volume percentage of the remainder in the microstructure to be 20% or less, desired resistance to impact and fracture can be obtained. Therefore, the total volume percentage of the structures may be 20% or less. The volume percentage of the remainder in the microstructure is as small as possible and may be 10% or less, 5% or less, and 0%.

Hereinafter, a method of measuring the volume percentage in the microstructure will be described.

Test pieces having, as an observed section, a cross section parallel to a rolling direction of the steel sheet and perpendicular to a steel sheet surface are collected from the steel sheet. The observed section of each of the test pieces is polished and subsequently is etched with nital. In a region of t/8 to 3t/8 (t represents the sheet thickness) from the surface where the ¼ thickness position from the surface in the sheet thickness direction is the center, an area of $2.0 \times 10^{-9}$ m$^2$ or more in total was observed using a field emission scanning electron microscope (FE-SEM) in one or more visual fields, various structures are identified based on the microstructural morphology (for example, a shape of crystal grains, a subgrain boundary in the crystal grains, or a formation state of carbides), and area ratios (area %) thereof are measured. The area ratio of each of the obtained structures can be considered as the volume percentage. As a result, the volume percentages of ferrite, unrecrystallized ferrite, martensite, and MA (a region including martensite and residual austenite), are obtained.

When a plurality of visual fields are observed, each of the areas analyzed in the visual fields is $4.0 \times 10^{-10}$ m$^2$ or more. In addition, the measurement of the area ratios is performed using a point counting method in each of the visual fields, 15 lines parallel to the rolling direction and 15 lines perpendicular to the rolling direction are drawn, and the structures are identified at 225 intersection points between the lines. Specifically, a massive region where cementite and a subgrain boundary are not present is identified as ferrite, and a massive region where a subgrain boundary is present without including cementite is identified as unrecrystallized ferrite. In addition, martensite and MA including a large amount of solid solution carbon look white due to higher brightness than that of the other structures, and thus can be distinguished from the other structures. Using the above-described method, the volume percentage of ferrite, the volume percentage of unrecrystallized ferrite, and the total volume percentage of "martensite and MA" are obtained. By calculating the sum of the obtained volume percentage of ferrite and the obtained volume percentage of unrecrystallized ferrite, the volume percentage of ferrite is obtained. In addition, by dividing the obtained volume percentage of unrecrystallized ferrite by the volume percentage of ferrite, the proportion of unrecrystallized ferrite in the ferrite is obtained.

The volume percentage of residual austenite is analyzed using an X-ray diffraction method. In the region of t/8 to 3t/8 (t represents the sheet thickness) from the surface of the test piece, a surface parallel to the steel sheet surface is mirror-finished, and the volume percentage of FCC steel is analyzed using the X-ray diffraction method. In addition, by subtracting the obtained volume percentage of residual austenite from the total volume percentage of "martensite and MA"

obtained by the observation with the FE-SEM, the volume percentage of martensite is obtained.

In addition, by subtracting the volume percentage of ferrite, the volume percentage of martensite, and the volume percentage of residual austenite from 100%, the volume percentage of the remainder in the microstructure is obtained.

In the microstructure of the steel sheet stretched by 10% at the ¼ thickness position from the surface in the sheet thickness direction, a number density of voids having a maximum diameter of 1.0 μm or more is $1.0 \times 10^9$ pieces/m$^2$ or less.

In the steel sheet according to the embodiment, in the microstructure of the steel sheet stretched by 10% at the ¼ thickness position from the surface in the sheet thickness direction, a number density of voids having a maximum diameter of 1.0 μm or more is $1.0 \times 10^9$ pieces/m$^2$ or less. Voids present in the microstructure of the steel sheet collapse at a stage before forming and cannot be observed. However, at a stage after forming, voids are formed and can be observed. In the steel sheet according to the embodiment, the number of voids is reduced. Therefore, at the stage before forming the number density of voids is also low. However, as described above, at the stage before forming, voids collapse and cannot be observed. Therefore, in the embodiment, the number density of voids after the formation of voids in the 10% stretched steel sheet is defined.

When the number density of voids having a maximum diameter of 1.0 μm or more is $1.0 \times 10^9$ pieces/m$^2$ or less, desired resistance to impact and fracture can be obtained. The number density of voids is preferably $0.7 \times 10^9$ pieces/m$^2$ or less and more preferably $0.5 \times 10^9$ pieces/m$^2$ or less. The maximum diameter refers to the maximum diameter of voids, and when voids have a flat shape, the maximum diameter refers to the length of the major axis.

It is presumed that, when a large amount of voids having a maximum diameter of 1.0 μm or more are present, the voids are combined to form cracks during forming and are likely to be fractured. When the maximum diameter of voids is less than 1.0 μm, it is difficult to combine the voids. Therefore, it is presumed that resistance to impact and fracture is not affected. Therefore, in the embodiment, the number density of voids having a maximum diameter of 1.0 μm or more is defined.

In the microstructure of the steel sheet stretched by 10% at the ¼ thickness position from the surface in the sheet thickness direction, the number density of voids having a maximum diameter of 1.0 μm or more is measured using the following method.

A 5 test piece is prepared according to JIS Z 2241:2011, and the rolling direction of the steel sheet is set as a tension axis to perform the tensile test, and a plastic strain of 10% is applied and unloaded. A small piece was cut out from the center of a parallel body of the test piece, and a test piece for observation having, as an observed section, a cross section parallel to the rolling direction and perpendicular to the steel sheet surface is collected. The observed section of the test piece for observation is polished and subsequently is etched with nital. In a region of t/8 to 3t/8 (t represents the sheet thickness) from the surface where the ¼ thickness position from the surface in the sheet thickness direction is the center, an area of $2.0 \times 10^{-9}$ m$^2$ or more in total was observed using a field emission scanning electron microscope (FE-SEM) in one or more visual fields, and the number of voids having a maximum diameter of 1.0 μm or more is counted. By dividing the obtained number of voids by the area of the observed section, the number density of voids having a maximum diameter of 1.0 μm or more is obtained.

Average Grain Size of Ferrite: 6.0 μm to 15.0 μm

In the microstructure at the ¼ thickness position from the surface of the steel sheet according to the embodiment in the sheet thickness direction, the average grain size of ferrite is preferably 6.0 μm to 15.0 μm. By setting the average grain size of ferrite to be 6.0 μm to 15.0 μm, a balance between the strength and the ductility can be further improved, that is, high strength and excellent ductility can be achieved simultaneously.

Hereinafter, a method of measuring the average grain size of ferrite will be described.

The average grain size of ferrite is obtained using a linear analysis method. In the visual fields where the volume percentages of ferrite, unrecrystallized ferrite, martensite, and MA are measured, one or more straight lines having a size of 200 μm or more in total in the rolling direction are drawn, 1 is added to the number of intersection points between the straight line and a ferrite grain boundary, and the obtained value is divided by the length of the straight line. As a result, the obtained value is set as the average grain size.

The steel sheet according to the embodiment may include a galvanized layer or a zinc alloy plated layer on a single surface or both surfaces of the steel sheet. In addition, the steel sheet according to the embodiment may include a galvannealed layer or an alloy galvannealed layer obtained by alloying a galvanized layer or a zinc alloy plated layer.

The plated layer formed on a single surface or both surfaces of the steel sheet according to the embodiment is preferably a galvanized layer or a zinc alloy plated layer including zinc as a main component. It is preferable that the zinc alloy plated layer includes Ni as an alloy component.

The galvanized layer and the zinc alloy plated layer are formed using a hot-dip plating method, an electroplating method, or a deposition plating method. When the Al content in the galvanized layer is 0.5 mass % or less, adhesion between the steel sheet surface and the galvanized layer can be ensured. Therefore, the Al content in the galvanized layer is preferably 0.5 mass % or less. When the galvanized layer is a hot-dip galvanized layer, in order to improve adhesion between the steel sheet surface and the galvanized layer, the Fe content in the hot-dip galvanized layer is preferably 3.0 mass % or less.

When the galvanized layer is an electrogalvanized layer, the Fe content in the plated layer is preferably 0.5 mass % or less from the viewpoint of improving corrosion resistance.

The galvanized layer and the zinc alloy plated layer may include one or two or more selected from the group consisting of Al, Ag, B, Be, Bi, Ca, Cd, Co, Cr, Cs, Cu, Ge, Hf, Zr, I, K, La, Li, Mg, Mn, Mo, Na, Nb, Ni, Pb, Rb, Sb, Si, Sn, Sr, Ta, Ti, V, W, Zr, and REM within a range where the corrosion resistance or formability of the steel sheet does not deteriorates. In particular, Ni, Al, and Mg are effective for improving corrosion resistance.

The galvanized layer or the zinc alloy plated layer on the surface of the steel sheet according to the embodiment may be a galvannealed layer or an alloy galvannealed layer obtained by alloying a galvanized layer or a zinc alloy plated layer. When the hot-dip galvanized layer or the hot-dip zinc alloy plated layer is alloyed, from the viewpoint of improving adhesion between the steel sheet surface and the alloy plated layer, the Fe content in the alloyed hot-dip galvanized layer (galvannealed layer) or the alloyed hot-dip zinc alloy plated layer (alloy galvannealed layer) is preferably 7.0 mass % to 13.0 mass %. By alloying the steel sheet including the hot-dip galvanized layer or the hot-dip zinc alloy plated layer, Fe is incorporated into the plated layer such that the Fe content increases. As a result, the Fe content can be made to be 7.0 mass % or more. That is, the galvanized layer having a Fe content of 7.0 mass % or more is a galvannealed layer or an alloy galvannealed layer.

The Fe content in the alloyed hot-dip galvanized layer (galvannealed layer) or the alloyed hot-dip zinc alloy plated layer (alloy galvannealed layer) can be obtained using method. Only the plated layer is removed by dissolving with a 5 vol % HCl aqueous solution to which an inhibitor is added. By measuring the Fe content in the obtained solution by inductively coupled plasma-atomic emission spectrometry (ICP-AES), the Fe content (mass %) in the galvanized layer is obtained.

The sheet thickness of the steel sheet according to the embodiment is not limited to a specific range but, in consideration of versatility or manufacturability is preferably 0.2 mm to 5.0 mm. When the sheet thickness is 0.2 mm or more, the shape of the steel sheet can be easily maintained to be flat, and the dimensional accuracy and the shape accuracy can be improved. Therefore, the sheet thickness is preferably 0.2 mm or more. The sheet thickness is more preferably 0.4 mm or more.

On the other hand, when the sheet thickness is 5.0 mm or less, appropriate strain application and temperature control can be easily performed in the process of manufacturing, a homogeneous structure can be obtained. Therefore, the sheet thickness is preferably 5.0 mm or less. The sheet thickness is more preferably 4.5 mm or less.

In the steel sheet according to the embodiment, the tensile strength is preferably 340 MPa or higher. The tensile strength is more preferably 400 MPa or higher. The upper limit is not particularly limited and may be, for example, 700 MPa or lower or 500 MPa or lower.

The tensile strength is measured by preparing a 5 test piece according to JIS Z 2241:2011 and setting the rolling direction of the steel sheet as a tension axis to perform the tensile test.

Next, a method of manufacturing the steel sheet according to the embodiment will be described.

As long as the steel sheet according to the embodiment has the above-described characteristics, the effects thereof can be obtained irrespective of the manufacturing method thereof. A manufacturing method including processes is preferable because the steel sheet according to the embodiment can be stably manufactured. In the following manufacturing method, by controlling the processes in a complex and indivisible way, a steel sheet having desired characteristics can be manufactured.

(I) a hot rolling process of heating a steel piece having a predetermined composition to 1150° C. to 1320° C., completing hot rolling such that a hot rolling completion temperature is 850° C. to 930° C., starting cooling after 1.5 s or longer, and cooling the steel piece to a temperature range of 500° C. or lower to obtain a hot-rolled steel sheet such that an average cooling rate in a temperature range of a cooling start temperature to 500° C. is 20° C./s or faster;

(II) a reheating process of heating the hot-rolled steel sheet to a temperature range of 500° C. to 700° C.;

(III) a cooling process of cooling the hot-rolled steel sheet to room temperature;

(IV) a cold rolling process of cold-rolling the hot-rolled steel sheet to obtain a cold-rolled steel sheet such that a total rolling reduction is 30% to 90% and a cold rolling completion temperature is 120° C. to 250° C.; and (V) an annealing process of heating the cold-rolled steel sheet to an annealing temperature of 720° C. to 850° C. and cooling to a temperature range of 500° C. or lower.

Hereinafter, preferable conditions in each of the processes will be described.

<Hot Rolling Process>

First, the steel piece having the composition of the above-described steel sheet according to the embodiment is heated to 1150° C. to 1320° C. When the heating temperature is 1150° C. or higher, carbides can be sufficiently dissolved. Therefore, the remaining of a coarse carbide in the hot-rolled steel sheet can be suppressed. In addition, when the heating temperature of the steel piece is 1320° C. or lower, the coarsening of crystal grains can be suppressed, and the structure can be sufficiently homogenized by hot rolling. From the viewpoint of manufacturing costs, it is preferable that the steel piece to be heated is produced by continuous casting. However, the steel piece may be produced using another casting method (for example, an ingot-making method).

After heating the steel piece, hot rolling is performed such that a hot rolling completion temperature is 850° C. to 930° C. When the hot rolling completion temperature is 850° C. or higher, rolling is performed in a single phase range. Therefore, anisotropy of the metallographic structure can be suppressed. Therefore, the hot rolling completion temperature is set to be 850° C. or higher. In addition, when the hot rolling completion temperature is 930° C. or lower, the excessive coarsening of the structure of primary austenite can be suppressed, and the structure can be homogenized. Therefore, the hot rolling completion temperature is set to be 930° C. or lower.

In the hot rolling process, Expression (1) needs to be satisfied in a temperature range of 1000° C. or lower. By controlling a pass schedule such that Expression (1) is satisfied in a temperature range of 1000° C. or lower, recrystallization progresses uniformly, and carbides precipitate finely and homogeneously in the steel. By satisfying Expression (1) in a temperature range of 1000° C. or lower, the segregation of carbides can be suppressed, and the formation of voids in a region where carbides segregate can be suppressed.

$$D_0 = 10^{(a_1 \cdot T_i^2 + a_2 \cdot T_i + a_3)} \quad \text{Expression (1)}$$

$$p_i = a_8 \cdot \exp\left(\frac{a_9}{T_i + 273}\right)$$

$$q_i = a_{10} \cdot \exp\left(\frac{a_{11}}{T_i + 273}\right)$$

$$D_i = D_{i-1} \cdot \frac{h_i}{2h_{i-1}} \cdot \exp\left(a_4 \cdot \left(\frac{t_i}{p_i}\right)^{a_5}\right)$$
$$+ 10^{(a_1 \cdot T_i^2 + a_2 \cdot T_i + a_3)} \cdot \frac{h_{i-1} - h_i}{2h_{i-1}} \cdot \left\{1 - \exp\left(a_4 \cdot \left(\frac{t_i}{p_i}\right)^{a_5}\right) + \exp\left(a_6 \cdot \left(\frac{t_i}{q_i}\right)^{a_7}\right)\right\}$$
$$+ 10^{(a_1 \cdot T_i^2 + a_2 \cdot T_i + a_3)} \cdot \frac{1}{2} \cdot \left\{1 - \exp\left(a_6 \cdot \left(\frac{t_i}{q_i}\right)^{a_7}\right)\right\} \quad D_n \leq 12.5$$

$D_n$ represents an index representing a degree of progress of precipitation of a fine carbide in a temperature range of 1000° C. or lower of the hot rolling process. Reference numerals in Expression (1) are as follows.

n: the number of rolling passes in the temperature range of 1000° C. or lower $T_i$: a rolling temperature in an i-th pass rolling $t_i$: an elapsed time [s] from the i-th pass rolling to an i+1-th pass rolling or an elapsed time [s] taken until a steel sheet temperature decreases to 850° C. from the i-th pass rolling Here, i represents a natural number of 1 to n.

$h_{i-1}$: a sheet thickness [mm] before the i-th pass rolling in the temperature range of 1000° C. or lower $h_i$: a sheet thickness [mm] after the i-th pass rolling in the temperature range of 1000° C. or lower $a_{1 \ to \ 11}$: constants    Expression (2)

$(a_1 = 2.54 \times 10^{-6}, a_2 = 3.62 \times 10^{-4}, a_3 = -6.38 \times 10^{-1},$ $a_4 = -3.00 \times 10^{-1}, a_5 = 8.50 \times 10^{-1}, a_6 = -8.50 \times 10^{-4},$ $a_7 = 2.40 \times 10^0, a_8 = 7.83 \times 10^{-13}, a_9 = 2.80 \times 10^5,$ $a_{10} = 6.00 \times 10^{-12},$ and $a_{11} = 2.80 \times 10^5),$ The steel piece starts to be cooled after 1.5 seconds or longer from completion of hot rolling, and is cooled to a temperature range of 500° C. or lower such that an average cooling rate in a temperature range of a cooling start temperature to 500° C. is 20° C./s or faster. As a result, a hot-rolled steel sheet is obtained.

By ensuring the time from the completion of hot rolling to the start of cooling to be 1.5 seconds or longer, recrystallization occurs, and a homogeneous structure is obtained. By setting the time to the start of cooling to 5.0 seconds or shorter, the abnormal growth of crystal grains can be suppressed, and a deviation in the grain size in the steel sheet can be suppressed, which is preferable.

By setting the average cooling rate in the temperature range of the cooling start temperature to 500° C. to be 20° C./s or faster, a carbide such as cementite can be made to finely precipitate in the steel. When the average cooling rate in the temperature range is 20° C./s or faster, the formation of a coarse carbide can be suppressed, and a desired microstructure in the finally obtained steel sheet can be obtained.

The upper limit of the average cooling rate is not particularly limited. Since a special cooling medium is required to obtain a cooling rate exceeding 200° C./s, the average cooling rate is preferably 200° C./s or slower from the viewpoint of production costs.

In the embodiment, the average cooling rate refers to a value obtained by dividing a temperature difference between a starting point and an end point in a range to be set by an elapsed time from the starting point and the end point.

<Reheating Process>

In the reheating process, the obtained hot-rolled steel sheet is heated to a temperature range of 500° C. to 700° C. By setting the maximum reheating temperature in the reheating process (the maximum temperature of the heating temperature in the reheating process) to be 500° C. to 700° C., a desired microstructure can be obtained, and resistance to impact and fracture can be ensured.

In addition, in the reheating process, a temperature history in the temperature range of 500° C. to 700° C. needs to satisfy Expression (2). Due to this heating, a fine carbide can be made to uniformly precipitate in the steel. By satisfying Expression (2) in the temperature range of 500° C. to 700° C., a fine carbide can be made to precipitate in the steel. As a result, the amount of solid solution carbon can be reduced, and the strength of the hot-rolled steel sheet can be reduced.

$$t_n = 10^{\frac{T_{n-1}+273}{T_n+273} log_{10} t_{n-1} - \left(1 - \frac{T_{n-1}+273}{T_n+273}\right) \cdot 20 \cdot (1+0.08Si)} + \Delta t_K$$    Expression (2)

$K_n = (T_n + 273) \cdot \{log_{10} t_n + 20 \cdot (1 + 0.08Si)\}$ $K_{20} \geq 1.50 \times 10^4$ In Expression (2), $K_{20}$ represents an index representing a degree of progress of precipitation of the fine carbide in a 20th period when a temperature history in the temperature range of 500° C. to 700° C. of the reheating process is divided into 20 periods with respect to time. Reference numerals in Expression (2) are as follows.

$T_n$: an average temperature [° C.] in an n-th period when a temperature history in the temperature range of 500° C. to 700° C. is divided into 20 periods with respect to time $\Delta t_K$: a time [hr.] in one of 20 periods into which a total residence time in the temperature range of 500° C. to 700° C. is divided, where $t_1 = \Delta t_K$ Si: a Si content [mass %]

Here, log 10 is a common logarithm with a base of 10.

<Cooling Process>

After the reheating process, the hot-rolled steel sheet is cooled to room temperature. At this time, the cooling rate is not particularly limited, and examples of a cooling method include air cooling. For example, the room temperature is 25° C., and the average cooling rate to room temperature during air cooling after reheating is 10° C./s or slower.

<Cold Rolling Process>

Next, the cooled hot-rolled steel sheet is cold-rolled to obtain a cold-rolled steel sheet such that a total rolling reduction is 30% to 90% and a cold rolling completion temperature is 120° C. to 250° C. As a result, a cold-rolled steel sheet is obtained. When the total rolling reduction is 30% or more, recrystallization in the subsequent heat treatment can be made to progress sufficiently, the remaining of unrecrystallized ferrite can be suppressed, and a desired microstructure can be finally obtained. Therefore, the total rolling reduction during cold rolling is set to be 30% or more. The total rolling reduction is preferably 45% or more and more preferably 60% or more. In addition, when the total rolling reduction in cold rolling is 90% or less, an increase in the anisotropy of the steel sheet can be suppressed, the number density of voids can be reduced, and the formability can be ensured. Therefore, the total rolling reduction during cold rolling is set to be 90% or less. In order to further improve the formability, the total rolling reduction is preferably 85% or less.

When the cold rolling completion temperature is 120° C. or higher, the number density of voids can be reduced, and a desired microstructure can be finally obtained. Therefore, the cold rolling completion temperature is set to be 120° C. or higher. The cold rolling completion temperature is preferably 150° C. or higher and more preferably 170° C. or higher. In addition, when the cold rolling completion temperature is 250° C. or lower, recrystallization can be made to progress sufficiently, and the formability can be secured. In order to make recrystallization efficiently progress to ensure the formability, the cold rolling completion temperature is set to be 250° C. or lower. The cold rolling completion temperature is preferably 230° C. or lower or 200° C. or lower.

<Annealing Process>

[Heating]

Next, a heat treatment (annealing) is performed on the steel sheet after cold rolling (cold-rolled steel sheet). First, the cold-rolled steel sheet is heated to an annealing temperature of 720° to 850° C. During this heating, in a temperature range of 720° C. to the annealing temperature (720° C. to 850° C.), a tension of 20 MPa or higher needs to be applied and a temperature history needs to satisfy Expression (3). By applying a tension of 20 MPa or higher in the temperature range of 720° C. to the annealing temperature, voids formed during cold rolling are sufficiently blocked, and a region where voids are present is blocked after forming. When the tension is less than 20 MPa, the formation of voids during cold rolling can be sufficiently suppressed. From this viewpoint, the tension to be applied is preferably 25 MPa or higher. By the temperature history in the temperature range of 720° C. to the annealing temperature satisfying the Expression (3), recrystallization is promoted, and the dissolution of cementite is promoted. As a result, a desired microstructure can be finally obtained.

$$1.0 \leq \sum_{i=1}^{10} \frac{d_1}{K_{20}} \cdot \exp\left(\frac{d_2}{T_i}\right) \cdot t'^{0.5} \leq 20.0 \quad \text{Expression (3)}$$

Reference numerals in Expression (3) are as follows.

$K_{20}$: a value obtained by Expression (2)

$d_1$ and $d_2$: constants ($d_1 = 9.67 \times 10^{10}$ and $d_2 = 1.25 \times 10^4$)

$T_i$: an average heat treatment temperature [° C.] in an i-th period when a temperature history in the temperature range of 720° C. to the annealing temperature is divided into 10 periods with respect to time t': 1/10 [s] of a residence time in the temperature range of 720° C. to the annealing temperature The annealing temperature in the annealing process is set to be 720° C. or higher. When the annealing temperature is 720° C. or higher, the dissolution and remaining of coarse cementite can be suppressed, recrystallization can be made to progress sufficiently, and a desired microstructure can be obtained. The annealing temperature is preferably 750° C. or higher and more preferably 780° C. or higher. In addition, when the annealing temperature is 850° C. or lower, an excessive reduction in the volume percentage of ferrite can be suppressed. Accordingly, the annealing temperature is set to be 850° C. or lower. In order to increase the volume percentage of ferrite to further improve formability, the annealing temperature is preferably 830° C. or lower and more preferably 810° C. or lower.

[Retention]

The retention time at the annealing temperature, that is, the time required until the annealing temperature reaches 720° C. again from the range of 720° C. or higher through the retention in the range of 720° C. to 850° C. during heating is preferably 3 seconds or longer. By setting the retention time to be 3 seconds or longer, cementite can be sufficiently dissolved, and the formability can be secured. The retention time is preferably 10 seconds or longer and more preferably 25 seconds or longer. The upper limit of the retention time is not particularly limited, but even when the retention time exceeds 200 seconds, there is no influence on the properties of the steel sheet. Therefore, the upper limit of the retention time is preferably 200 seconds or shorter from the viewpoint of production costs.

[Cooling]

After being heated to the annealing temperature and held at the temperature for the retention time, the steel sheet is cooled.

During cooling the steel sheet to a temperature range of 500° C. or lower, a temperature history in a temperature range of 720° C. to 500° C. needs to satisfy Expression (4). By performing cooling such that the temperature history in the temperature range of 720° C. to 500° C. satisfies Expression (4), the formation of a hard phase (martensite and residual austenite) is suppressed. As a result, a desired microstructure can be finally obtained.

$$\sum_{i=1}^{10}\left(g_1 + g_2 \cdot Nb^{0.5} + g_3 \cdot Ti*^{0.5}\right) \cdot \quad \text{Expression (4)}$$

$$\left(1 + g_4 \cdot Mo^{0.5}\right)^{-1} \cdot \left(\frac{A_{c3} - T_{max}}{A_{c3} - A_{c1}}\right)^{-1/3} \cdot$$

$$\left(\Delta_i + g_5 \cdot \Delta_i^{0.5}\right) \cdot \exp\left(-\frac{g_6}{T_1 + 273}\right) \cdot t'^{0.5} \geq 1.0$$

Reference numerals in Expression (4) are as follows.

$\Delta_i$: $750 - 18 \times Si - 17 \times Mn - 10 \times Cr - 8 \times Ni + 15 \times Al - T_i$ where each of the elements represents a content by mass % of the element, and when the element is not included, 0 is substituted as the content of the element.

In addition, when a calculated value of $\Delta_i$ is a negative value, $\Delta_i$ is set to 0.

$g_{1\ to\ 6}$: constants ($g_1 = 1.00 \times 10^{-1}$, $g_2 = 1.46 \times 10^{-1}$, $g_3 = 1.14 \times 10^{-1}$, $g_4 = 2.24 \times 10^0$, $g_5 = 4.53 \times 10^0$, and $g_6 = 4.83 \times 10^3$)

Nb, Mo, Si, Mn, Cr, Ni, and Al: a content [mass %] of each of the elements, where when the element is not included, 0 is substituted as the content of the element Ti*: an effective Ti content represented by $Ti - 42/14 \times N$, where Ti and N represent a content [mass %] of each of the elements, when the element is not included, 0 is substituted as the content of the element, a minimum value is set to 0

$T_i$: an average heat treatment temperature [° C.] in an i-th period when a temperature history in the temperature range of 720° C. to 500° C. is divided into 10 periods with respect to time $Ac_1$ and $Ac_3$: a transformation start temperature and a transformation completion temperature [° C.] during heating $T_{max}$: a highest heating temperature [C] in a heat treatment process t': 1/10 [s] of a residence time in the temperature range of 720° C. to 500° C.

After the annealing process, hot-dip galvanizing or hot-dip zinc alloy plating may be performed on the steel sheet in a temperature range of 500° C. or lower. At this time, the steel sheet may be reheated before being dipped in a plating bath. In addition, the plated steel sheet may be heated to alloy the plated layer.

$Ac_1$ and $Ac_3$ in the embodiment are obtained by heating a small piece cut from a cold-rolled steel sheet provided in the annealing process and obtaining a thermal expansion change of the small piece during heating.

By performing electroplating or deposition plating on the steel sheet after the annealing process to form a galvanized layer on a single surface or both surfaces of the steel sheet, a galvanized steel sheet including the galvanized layer may be manufactured.

The atmosphere in the annealing process may be controlled to reform the surface of the steel sheet. For example, by performing heating in a decarburization atmosphere, a steel sheet having excellent bendability where a surface layer area of the steel sheet is appropriately decarburized is obtained.

<Temper Rolling Process>

After the annealing process, temper rolling may be performed such that the total rolling reduction is 0.05% to 2.00%. By performing the temper rolling, the surface shape can be flattened and the surface roughness can be adjusted.

EXAMPLES

Next, examples of the present invention will be described, but conditions of the examples are merely exemplary to confirm the operability and the effects of the present invention. The present invention is not limited to these condition examples. The present invention can adopt various conditions within a range not departing from the scope of the present invention as long as the object of the present invention can be achieved under the conditions.

Next, examples of the present invention will be described, but conditions of the examples are merely exemplary to describe the operability and the effects of the present invention. The present invention is not limited to these condition examples. The present invention can adopt various conditions within a range not departing from the scope of the present invention as long as the object of the present invention can be achieved under the conditions.

Molten steels having chemical compositions shown in Table 1 were cast to manufacture steel pieces. Next, hot-rolled steel sheets were obtained by hot-rolling the steel pieces under conditions shown in Table 2. Tables 2 shows $D_n$ obtained from hot rolling conditions in a temperature range of 1000° C. or lower in the hot rolling process and Expression (1).

Next, the steel pieces were reheated under conditions shown in Table 2. Table 2 shows $K_{20}$ obtained from the temperature history in a temperature range of 500° C. to 700° C. in the reheating process and Expression (2). After reheating, the hot-rolled steel sheets were cooled to room temperature (25° C.) at an average cooling rate of 10° C./s or slower.

Next, steel sheets were obtained by performing cold rolling, a heat treatment (annealing), and temper rolling on the hot-rolled steel sheets under conditions shown in Tables 3-1 and 3-2. For annealing, the steel sheets were heated to annealing temperatures shown in Tables 3-1 and 3-2, were retained at the temperatures for 3 seconds to 200 seconds (the time required until the annealing temperature reached 720° C. again from the range of 720° C. or higher through the retention in the range of 720° C. to 850° C. during heating was 3 seconds to 200 seconds), and subsequently were cooled.

Tables 3-1 and 3-2 show the values of the middle side of Expression (3) obtained from a temperature history in a range of 720° C. to the annealing temperature during heating in the annealing process and Expression (3). In addition, Tables 3-1 and 3-2 show the values of the left side of Expression (4) and a temperature history in a temperature range of 720° C. to 500° C. during cooling in the annealing process and Expression (4).

The plating process in Tables 3-1 and 3-2 is as follows.

Zn alloy plating: a process of cooling the steel sheet to a temperature range of 500° C. or lower in the annealing process, dipping the steel sheet in a molten zinc alloy bath, and cooling the steel sheet to room temperature to obtain a zinc alloy plated steel sheet.

Alloy Galvannealing: a process of cooling the steel sheet to a temperature range of 500° C. or lower in the annealing process, dipping the steel sheet in a molten zinc alloy bath and reheating the steel sheet to 580° C. for alloying and cooling the steel sheet to room temperature to obtain an alloy galvannealed steel sheet.

GA: a process of cooling the steel sheet to a temperature range of 500° C. or lower in the annealing process, dipping the steel sheet in a molten zinc bath and reheating the steel sheet to 560° C. for alloying and cooling the steel sheet to room temperature to obtain a hot-dip galvannealed steel sheet (GA).

GI: a process of cooling the steel sheet to a temperature range of 500° C. or lower in the annealing process, dipping the steel sheet in a molten zinc bath, and cooling the steel sheet to room temperature to obtain a hot-dip galvanized steel sheet (GI).

Deposition: a process of performing deposition plating after the annealing process to obtain a galvanized steel sheet.

EG: a process of performing electrogalvanizing after the annealing process to obtain an electrogalvanized steel sheet (EG).

Tables 4-1 and 4-2 show the properties of the steel sheets obtained under the manufacturing conditions shown in Tables 1 to 3-2. As the results of the structure observation performed using the above-described method, Tables 4-1 and 4-2 show the volume percentage of ferrite, the proportion of unrecrystallized ferrite in ferrite, the volume percentage of martensite, the volume percentage of residual austenite, and the average grain size of ferrite. The proportion of unrecrystallized ferrite in ferrite was measured OIM Data Collection and OIM Data Analysis manufactured by TSL. In addition, Tables 4-1 and 4-2 also show the number density of voids having a maximum diameter of 1.0 μm or more measured using the above-described method. The sheet thickness of the steel sheet was the same as the sheet thickness after rolling shown in Tables 3-1 and 3-2.

Regarding the alloyed steel sheet, the Fe content in the alloyed hot-dip galvanized layer (galvannealed layer) or the alloyed hot-dip zinc alloy plated layer (alloy galvannealed layer) was measured using the above-described method.

The plated layers in Tables 4-1 and 4-2 are as follows.
Zn alloy plated: zinc alloy plated layer
Alloy Galvannealed: alloy galvannealed layer
GA: hot-dip galvannealed layer formed by dipping the steel sheet in a molten zinc bath and alloying the steel sheet
GI: hot-dip galvanized layer formed by dipping the steel sheet in a molten zinc bath
Deposited: galvanized layer formed by deposition plating
EG: galvanized layer formed by electrogalvanizing Tables 5-1 and 5-2 show the properties of the steel sheets obtained under the manufacturing conditions of Tables 1 to 3-2. The yield strength (YS) and the maximum tensile strength were obtained by performing a tensile test. A 5 test piece was prepared according to JIS Z 2241:2011, and the rolling direction of the steel sheet is set as a tension axis to perform the tensile test. A steel sheet where the maximum tensile strength in the tensile test was 340 MPa or higher was determined to have excellent strength and as "Pass". On the other hand, a steel sheet where the maximum tensile strength in the tensile test was lower than 340 MPa was determined to have poor strength and as "Fail". In addition, a steel sheet where the uniform elongation (uEl) obtained from the tensile test was 15% or more was determined to have excellent formability and as "Pass". On the other hand, a steel sheet where the uniform elongation was less than 15% was determined to have poor formability and as "Fail".

A tensile test was performed under the same conditions as those of the above-described tensile test, and a strain of 15% was applied and unloaded. A semi-circular notch having a radius of 1.0 mm was provided at both ends of the center of a parallel body of the test piece, and the tensile test was performed again until the test piece was fractured at −40° C. As a result, a breaking stress σ2 at −40° C. and a maximum stress σ1 before unloading were obtained.

Next, a Charpy impact test was performed. When the sheet thickness of the steel sheet was less than 2.5 mm, a stacked Charpy test piece obtained by stacking the steel sheets until the total sheet thickness exceeded 5.0 mm, fastening the steel sheets by bolts, and providing a V-notch having a depth of 2 mm was used as a test piece. The other conditions were determined according to JIS Z 2242:2018. As a result, a ductile-brittle transition temperature where a brittle fracture surface ratio was 50% or more was obtained.

Regarding a steel sheet where a value (σ2/σ1) obtained by dividing the breaking stress σ2 at −40° C. by the maximum stress σ1 before unloading that were obtained using the above-described method was 0.70 or less and the ductile-brittle transition temperature where a brittle fracture surface ratio was 50% or more was−40° C. or lower, this steel sheet was determined to have sufficiently high deformability during impact deformation after forming (excellent impact resistance) and determined as "Pass".

On the other hand, regarding a steel sheet where σ2/σ1 was more than 0.70 and/or the ductile-brittle transition temperature where the brittle fracture surface ratio was 50% or more was higher than −40° C., this steel sheet was determined to have poor impact resistance and as "Fail".

TABLE 1

| | Composition, mass %, Remainder including Fe and Impurities | | | | | | | | | |
|---|---|---|---|---|---|---|---|---|---|---|
| Steel | C | Si | Mn | Al | P | S | N | O | Others | Note |
| A | 0.063 | 0.126 | 1.87 | 0.073 | 0.016 | 0.0026 | 0.0049 | 0.0013 | | Example |
| B | 0.025 | 0.390 | 1.34 | 0.049 | 0.006 | 0.0035 | 0.0016 | 0.0011 | | Example |
| C | 0.130 | 0.374 | 1.68 | 0.144 | 0.023 | 0.0071 | 0.0070 | 0.0019 | | Example |
| D | 0.171 | 0.200 | 0.79 | 0.261 | 0.004 | 0.0015 | 0.0042 | 0.0015 | Zr: 0.0013 | Example |
| E | 0.092 | 0.006 | 1.29 | 0.054 | 0.029 | 0.0052 | 0.0112 | 0.0010 | Ti: 0.015, Nb: 0.012 | Example |
| F | 0.083 | 0.749 | 0.26 | 0.087 | 0.041 | 0.0063 | 0.0077 | 0.0009 | | Example |
| G | 0.071 | 0.521 | 0.09 | 0.097 | 0.023 | 0.0026 | 0.0053 | 0.0008 | Ni: 0.61, Cu: 0.13 | Example |
| H | 0.187 | 0.044 | 1.54 | 0.330 | 0.007 | 0.0098 | 0.0021 | 0.0015 | Ce: 0.0012, La: 0.0018 | Example |
| I | 0.091 | 0.058 | 0.23 | 0.018 | 0.079 | 0.0024 | 0.0025 | 0.0020 | Nb: 0.046 | Example |
| J | 0.158 | 0.012 | 1.97 | 0.451 | 0.011 | 0.0091 | 0.0033 | 0.0016 | V: 0.164 | Example |
| K | 0.088 | 0.808 | 0.57 | 0.037 | 0.028 | 0.0074 | 0.0069 | 0.0024 | Ni: 0.27, Cr: 0.27 | Example |
| L | 0.088 | 1.341 | 0.34 | 0.317 | 0.020 | 0.0046 | 0.0056 | 0.0019 | Cr: 0.71 | Example |
| M | 0.015 | 0.938 | 1.72 | 0.029 | 0.003 | 0.0064 | 0.0015 | 0.0009 | | Example |
| N | 0.128 | 0.098 | 2.71 | 0.550 | 0.015 | 0.0021 | 0.0065 | 0.0016 | | Example |
| O | 0.144 | 0.123 | 0.67 | 0.066 | 0.007 | 0.0138 | 0.0020 | 0.0012 | Ca: 0.0035 | Example |
| P | 0.081 | 0.269 | 2.33 | 0.184 | 0.018 | 0.0048 | 0.0093 | 0.0012 | Ti: 0.027 | Example |
| Q | 0.048 | 0.028 | 1.59 | 0.714 | 0.020 | 0.0089 | 0.0022 | 0.0008 | Mg: 0.0020 | Example |
| R | 0.134 | 0.270 | 0.82 | 0.008 | 0.025 | 0.0087 | 0.0133 | 0.0012 | Ti: 0.076 | Example |
| S | 0.037 | 0.874 | 1.17 | 0.084 | 0.029 | 0.0045 | 0.0074 | 0.0034 | | Example |
| T | 0.091 | 0.716 | 0.36 | 0.025 | 0.012 | 0.0053 | 0.0007 | 0.0009 | Sb: 0.08 | Example |
| U | 0.141 | 0.916 | 0.18 | 0.027 | 0.010 | 0.0065 | 0.0016 | 0.0014 | W: 0.093 | Example |
| V | 0.109 | 0.388 | 1.09 | 0.084 | 0.035 | 0.0026 | 0.0045 | 0.0010 | Sn: 0.17 | Example |
| W | 0.060 | 0.298 | 1.66 | 0.106 | 0.052 | 0.0035 | 0.0035 | 0.0018 | | Example |
| X | 0.052 | 0.168 | 0.38 | 0.048 | 0.069 | 0.0014 | 0.0081 | 0.0006 | Mo: 0.32 | Example |
| Y | 0.118 | 0.385 | 0.69 | 0.052 | 0.017 | 0.0043 | 0.0103 | 0.0018 | B: 0.0031 | Example |
| Z | 0.102 | 0.066 | 1.45 | 0.215 | 0.004 | 0.0004 | 0.0089 | 0.0017 | REM: 0.0013 | Example |
| AA | <u>0.006</u> | 0.672 | 1.33 | 0.019 | 0.012 | 0.0035 | 0.0032 | 0.0016 | | Comparative Example |
| AB | <u>0.227</u> | 0.227 | 1.42 | 0.052 | 0.007 | 0.0030 | 0.0056 | 0.0014 | | Comparative Example |
| AC | 0.123 | <u>1.725</u> | 0.70 | 0.048 | 0.020 | 0.0031 | 0.0027 | 0.0017 | | Comparative Example |
| AD | 0.078 | 0.250 | <u>3.31</u> | 0.060 | 0.014 | 0.0040 | 0.0056 | 0.0010 | | Comparative Example |

The underline represents that the value is outside of the range of the present invention.

TABLE 2

| Steel | Hot-Rolled Steel Sheet | Hot Rolling Process Steel Piece Heating Temperature °C. | Rolling Completion Temperature °C. | $D_n$ | Time to Start of Cooling | Average Cooling Rate from Cooling Start Temperature to 500° C. °C./s | Reheating Process Maximum Reheating Temperature °C. | $K_{20} \times 10^4$ | Note |
|---|---|---|---|---|---|---|---|---|---|
| A | A1 | 1185 | 907 | 11.9 | 3.2 | 69 | 534 | 1.68 | Example |
| A | A2 | 1265 | 904 | 8.1 | 1.6 | 26 | 604 | 1.63 | Example |
| A | A3 | 1286 | 915 | <u>14.5</u> | 3.1 | 41 | 644 | 1.60 | Comparative Example |
| A | A4 | 1306 | 882 | 7.2 | 2.9 | 65 | <u>478</u> | — | Comparative Example |
| B | B1 | 1161 | 871 | 8.0 | 2.0 | 34 | 612 | 1.55 | Example |
| B | B2 | 1236 | 904 | 8.7 | 2.3 | 51 | <u>734</u> | — | Comparative Example |
| B | B3 | 1216 | 885 | 11.7 | 2.2 | 41 | 589 | 1.67 | Example |
| C | C1 | 1184 | 916 | 10.3 | 1.7 | 82 | 674 | 1.66 | Example |
| C | C2 | 1278 | 925 | 8.9 | 2.3 | 46 | 597 | 1.78 | Example |
| C | C3 | <u>1130</u> | 912 | 11.2 | 2.2 | 26 | 562 | 1.72 | Comparative Example |
| D | D | 1191 | 908 | 8.8 | 2.5 | 34 | 630 | 1.86 | Example |
| E | E | 1269 | 881 | 6.9 | 3.0 | 41 | 571 | 1.58 | Example |
| F | F1 | 1216 | 920 | 10.4 | 1.9 | 78 | 685 | 1.69 | Example |
| F | F2 | 1314 | 881 | 9.5 | 2.9 | 38 | 617 | 1.79 | Example |
| F | F3 | 1261 | 905 | 8.3 | 2.9 | <u>14</u> | 520 | 1.55 | Comparative Example |
| G | G | 1246 | 898 | 10.2 | 2.7 | 40 | 630 | 1.65 | Example |
| H | H | 1250 | 857 | 7.5 | 3.2 | 42 | 538 | 1.52 | Example |
| I | I | 1302 | 913 | 10.0 | 2.6 | 47 | 663 | 1.64 | Example |
| J | J | 1262 | 880 | 9.1 | 3.4 | 54 | 544 | 1.67 | Example |
| K | K1 | 1169 | 901 | 11.0 | 3.1 | 39 | 522 | 1.74 | Example |
| K | K2 | 1222 | 876 | 6.6 | 2.3 | 23 | 693 | 1.81 | Example |
| K | K3 | 1278 | <u>839</u> | — | 2.2 | 37 | 620 | 1.90 | Comparative Example |
| L | L | 1283 | 887 | 6.9 | 3.1 | 47 | 561 | 1.72 | Example |
| M | M | 1224 | 874 | 9.0 | 2.0 | 56 | 623 | 1.81 | Example |
| N | N | 1250 | 915 | 10.9 | 2.6 | 44 | 680 | 1.61 | Example |
| O | O | 1260 | 885 | 5.5 | 2.4 | 47 | 608 | 1.64 | Example |
| P | P1 | 1215 | 906 | 8.3 | 1.8 | 63 | 581 | 1.80 | Example |
| P | P2 | 1209 | 911 | 7.3 | 3.1 | 35 | 506 | 1.65 | Example |
| P | P3 | 1281 | 892 | 10.8 | 2.8 | 38 | 539 | <u>1.45</u> | Comparative Example |
| P | P4 | 1247 | 906 | 10.5 | <u>0.8</u> | 32 | 601 | 1.52 | Comparative Example |
| Q | Q | 1226 | 883 | 6.0 | 3.4 | 35 | 584 | 1.61 | Example |
| R | R | 1236 | 864 | 8.4 | 2.9 | 50 | 600 | 1.56 | Example |
| S | S | 1173 | 880 | 7.1 | 2.0 | 61 | 577 | 1.56 | Example |
| T | T | 1196 | 894 | 7.9 | 1.7 | 66 | 656 | 1.69 | Example |
| U | U | 1212 | 908 | 9.9 | 2.3 | 56 | 620 | 1.94 | Example |
| V | V | 1183 | 879 | 5.9 | 2.6 | 38 | 661 | 1.81 | Example |
| W | W1 | 1175 | 877 | 9.6 | 2.7 | 33 | 684 | 2.00 | Example |
| W | W2 | 1183 | 888 | 9.3 | 2.4 | 50 | 520 | 1.52 | Example |
| W | W3 | 1217 | <u>948</u> | 8.1 | 2.4 | 34 | 565 | 1.80 | Comparative Example |
| W | W4 | <u>1348</u> | 902 | 8.9 | 2.9 | 27 | 568 | 1.59 | Comparative Example |
| X | X | 1242 | 900 | 7.1 | 3.0 | 73 | 568 | 1.73 | Example |
| Y | Y | 1246 | 913 | 7.3 | 2.6 | 37 | 545 | 1.75 | Example |
| Z | Z | 1272 | 907 | 9.4 | 2.5 | 47 | 566 | 1.74 | Example |
| <u>AA</u> | AA | 1243 | 905 | 7.8 | 2.3 | 52 | 629 | 1.93 | Comparative Example |
| <u>AB</u> | AB | 1270 | 895 | 9.5 | 2.4 | 45 | 620 | 1.72 | Comparative Example |
| <u>AC</u> | AC | 1233 | 893 | 9.5 | 3.0 | 41 | 595 | 1.86 | Comparative Example |
| <u>AD</u> | AD | 1222 | 871 | 6.6 | 2.5 | 40 | 544 | 1.69 | Comparative Example |

The underline represents that the value is outside of the range of the present invention.

TABLE 3-1

| Example | Hot-Rolled Steel Sheet | Steel | Cold Rolling Process ||||| Annealing Process Heating Annealing Temperature ° C. | Annealing Process Heating Tension MPa | Annealing Process Heating Middle Side of Expression (3) | Annealing Process Cooling Left Side of Expression (4) | Temper Rolling Process Total Rolling Reduction % | Plating Process | Note |
|---|---|---|---|---|---|---|---|---|---|---|---|---|---|
| | | | Sheet Thickness before Rolling mm | Sheet Thickness after Rolling mm | Total Rolling Reduction % | Rolling Completion Temperature ° C. | | | | | | | |
| 1 | A | A1 | 3.4 | 1.0 | 71 | 156 | 760 | 40 | 4.9 | 2.3 | 0.45 | | Example |
| 2 | A | A1 | 3.4 | 1.3 | 62 | 153 | 726 | 26 | 7.3 | 1.8 | 0.47 | GA | Example |
| 3 | A | A1 | 3.4 | 1.0 | 71 | 189 | 868 | 33 | — | — | 0.59 | | Comparative Example |
| 4 | A | A1 | 3.4 | 1.0 | 71 | 181 | 783 | 31 | 24.3 | 1.5 | 0.13 | | Comparative Example |
| 5 | A | A2 | 5.0 | 1.5 | 70 | 178 | 768 | 38 | 7.3 | 1.9 | 0.31 | | Example |
| 6 | A | A2 | 5.0 | 0.4 | 92 | 162 | 758 | 28 | 10.5 | 1.4 | 0.35 | | Comparative Example |
| 7 | A | A3 | 1.8 | 0.6 | 67 | 143 | 743 | 26 | 3.2 | 1.7 | 0.46 | | Comparative Example |
| 8 | A | A4 | 3.2 | 1.2 | 63 | 131 | 788 | 25 | — | 1.6 | 0.40 | | Comparative Example |
| 9 | B | B1 | 4.0 | 1.0 | 75 | 213 | 751 | 27 | 6.5 | 1.1 | 0.14 | GI | Example |
| 10 | B | B2 | 3.8 | 1.6 | 58 | 205 | 760 | 29 | — | 1.7 | 0.36 | | Comparative Example |
| 11 | B | B3 | 2.4 | 1.2 | 50 | 186 | 799 | 39 | 13.7 | 1.5 | 0.33 | | Example |
| 12 | C | C1 | 1.6 | 0.4 | 75 | 149 | 829 | 34 | 19.0 | 2.8 | 0.32 | EG | Example |
| 13 | C | C1 | 1.6 | 0.8 | 50 | 138 | 783 | 39 | 9.9 | 0.7 | 0.23 | | Comparative Example |
| 14 | C | C2 | 2.3 | 0.6 | 74 | 138 | 805 | 39 | 14.8 | 1.6 | 0.52 | | Example |
| 15 | C | C3 | 2.0 | 0.7 | 65 | 161 | 785 | 40 | 8.6 | 1.5 | 0.24 | | Comparative Example |
| 16 | D | D | 3.2 | 1.3 | 59 | 139 | 787 | 39 | 16.7 | 2.1 | 0.10 | Deposition | Example |
| 17 | E | E | 2.2 | 1.1 | 50 | 173 | 780 | 38 | 6.0 | 2.8 | 1.10 | | Example |
| 18 | F | F1 | 3.4 | 1.3 | 62 | 205 | 816 | 24 | 14.7 | 1.5 | — | GA | Example |
| 19 | F | F1 | 3.4 | 1.7 | 50 | 135 | 800 | | | | | | |
| 20 | F | F2 | 4.4 | 2.6 | 41 | 141 | 776 | | | | | | |
| 21 | F | F3 | 5.0 | 1.7 | 66 | 175 | 784 | | | | | | |
| 22 | G | G | 3.0 | 1.4 | 53 | 175 | 794 | | | | | | |
| 23 | H | H | 2.6 | 1.6 | 38 | 131 | 736 | | | | | | |
| 24 | I | I | 4.0 | 1.6 | 60 | 138 | 795 | | | | | | |
| 25 | J | J | 2.8 | 1.2 | 57 | 180 | 778 | | | | | | |
| 26 | K | K1 | 4.0 | 1.2 | 70 | 170 | 799 | | | | | | |
| 27 | K | K1 | 4.0 | 1.7 | 58 | 153 | 681 | | | | | | |
| 28 | K | K2 | 5.0 | 3.0 | 40 | 136 | 749 | | | | | | |
| 29 | K | K3 | 2.6 | 1.5 | 42 | 141 | 784 | | | | | | |
| 30 | L | L | 1.8 | 1.1 | 39 | 140 | 828 | | | | | | |

TABLE 3-1-continued

| | | | | | | |
|---|---|---|---|---|---|---|
| 19 | 40 | 10.7 | 1.8 | 0.36 | | Example |
| 20 | 33 | 8.3 | 1.6 | 0.48 | | Example |
| 21 | 29 | 15.5 | 1.9 | 0.21 | | Comparative Example |
| 22 | 30 | 13.1 | 1.2 | 0.84 | Deposition | Example |
| 23 | 29 | 3.0 | 1.4 | 0.49 | | Example |
| 24 | 35 | 10.9 | 2.6 | 0.40 | EG | Example |
| 25 | 33 | 14.7 | 1.5 | 0.17 | | Example |
| 26 | 39 | 11.9 | 1.7 | 0.44 | GI | Example |
| 27 | 27 | — | — | 0.26 | | Comparative Example |
| 28 | 29 | 35 | 1.3 | 0.64 | | Example |
| 29 | 38 | 13.3 | 1.3 | 0.13 | | Comparative Example |
| 30 | 37 | 9.9 | 1.7 | 0.49 | GA | Example |

The underline represents that the value is outside of the range of the present invention.

TABLE 3-2

| | | | Cold Rolling Process | | | | Annealing Process |
|---|---|---|---|---|---|---|---|
| Example | Steel | Hot-Rolled Steel Sheet | Sheet Thickness before Rolling mm | Sheet Thickness after Rolling mm | Total Rolling Reduction % | Rolling Completion Temperature °C | Heating Annealing Temperature °C |
| 31 | M | M | 4.4 | 1.9 | 57 | 207 | 816 |
| 32 | N | N | 2.4 | 1.3 | 46 | 176 | 781 |
| 33 | O | O | 2.2 | 1.1 | 50 | 189 | 768 |
| 34 | P | P1 | 2.6 | 0.9 | 65 | 127 | 833 |
| 35 | P | P1 | 2.6 | 0.9 | 65 | 135 | 754 |
| 36 | P | P2 | 3.4 | 1.2 | 65 | 238 | 786 |
| 37 | P | P2 | 2.8 | 2.2 | <u>21</u> | 123 | 796 |
| 38 | P | P3 | 4.2 | 1.4 | <u>67</u> | 128 | 786 |
| 39 | P | <u>P4</u> | 1.6 | 0.6 | 63 | 167 | 795 |
| 40 | Q | <u>Q</u> | 1.4 | 0.5 | 64 | 148 | 845 |
| 41 | R | R | 3.8 | 1.4 | 63 | 161 | 751 |
| 42 | S | S | 3.4 | 1.9 | 44 | 163 | 777 |
| 43 | T | T | 3.0 | 1.3 | 57 | 167 | 810 |
| 44 | U | U | 4.6 | 2.4 | 48 | 139 | 816 |
| 45 | V | V | 2.0 | 0.9 | 55 | 124 | 765 |
| 46 | W | W1 | 3.8 | 0.6 | 84 | 194 | 748 |
| 47 | W | W1 | 3.8 | 1.4 | 63 | 150 | 792 |
| 48 | W | W2 | 5.0 | 2.8 | 44 | 219 | 828 |
| 49 | W | W3 | 3.8 | 1.5 | 61 | 216 | 774 |
| 50 | W | <u>W4</u> | 2.2 | 0.9 | 59 | 138 | 782 |
| 51 | X | <u>X</u> | 4.8 | 2.5 | 48 | 139 | 806 |
| 52 | Y | Y | 3.6 | 1.8 | 50 | 147 | 776 |
| 53 | Z | Z | 3.6 | 1.2 | 67 | 129 | 743 |
| 54 | AA | AA | 4.4 | 1.2 | 73 | 196 | 790 |
| 55 | <u>AB</u> | <u>AB</u> | 2.4 | 1.2 | 50 | 178 | 794 |
| 56 | <u>AC</u> | <u>AC</u> | 1.6 | 1.0 | 38 | 183 | 815 |
| 57 | <u>AD</u> | <u>AD</u> | 2.2 | 0.6 | 73 | 163 | 748 |
| 58 | A | A1 | 3.4 | 1.2 | 65 | <u>56</u> | 752 |
| 59 | A | A1 | 3.4 | 0.8 | 76 | <u>306</u> | 756 |

| | Annealing Process | | | Temper Rolling | | |
|---|---|---|---|---|---|---|
| | Heating | | Cooling | Process Total | | |
| Example | Tension MPa | Middle Side of Expression (3) | Left Side of Expression (4) | Rolling Reduction % | Plating Process | Note |
| 31 | 26 | 8.9 | 1.7 | 0.34 | | Example |
| 32 | 32 | 15.0 | 1.5 | 0.52 | GI | Example |
| 33 | 35 | 2.6 | 1.4 | 0.36 | Zn Alloy Plating | Example |
| 34 | 27 | 13.4 | 5.7 | 0.36 | Alloy Galvannealing | Example |
| 35 | 24 | <u>0.8</u> | 1.6 | 0.80 | | Comparative Example |

TABLE 3-2-continued

| | | | | | | |
|---|---|---|---|---|---|---|
| 36 | 29 | 9.8 | 2.6 | 0.59 | | Example |
| 37 | 37 | 12.7 | 1.7 | 0.24 | | Comparative Example |
| 38 | 25 | 7.9 | 1.3 | 0.59 | | Comparative Example |
| 39 | 31 | 8.7 | 1.3 | 0.25 | | Comparative Example |
| 40 | 32 | 17.9 | 1.5 | 0.47 | Alloy Galvannealing | Example |
| 41 | 39 | 1.6 | 1.5 | 0.81 | | Example |
| 42 | 31 | 5.8 | 1.5 | 0.43 | GI | Example |
| 43 | 38 | 13.4 | 1.4 | 0.56 | | Example |
| 44 | 28 | 6.8 | 1.5 | 0.27 | EG | Example |
| 45 | 30 | 6.9 | 1.6 | 0.44 | | Example |
| 46 | 31 | 2.2 | 1.6 | 0.73 | GA | Example |
| 47 | 9 | 12.1 | 1.4 | 0.42 | | Comparative Example |
| 48 | 30 | 12.2 | 1.2 | 0.35 | | Example |
| 49 | 36 | 12.1 | 1.3 | 0.42 | | Comparative Example |
| 50 | 34 | 11.1 | 1.7 | 0.46 | | Comparative Example |
| 51 | 27 | 8.1 | 1.8 | 1.53 | | Example |
| 52 | 24 | 8.0 | 1.8 | 0.67 | Zn Alloy Plating | Example |
| 53 | 37 | 11.5 | 3.4 | 0.30 | | Example |
| 54 | 31 | 5.4 | 1.4 | 0.70 | | Comparative Example |
| 55 | 31 | 10.1 | 1.9 | 0.70 | | Comparative Example |
| 56 | 39 | 13.6 | 1.7 | 0.70 | | Comparative Example |
| 57 | 40 | 11.0 | 1.7 | 0.70 | | Comparative Example |
| 58 | 27 | 17.3 | 1.4 | 0.25 | | Comparative Example |
| 59 | 29 | 2.5 | 1.3 | 0.31 | | Comparative Example |

The underline represents that the value is outside of the range of the present invention.

TABLE 4-1

| | | | Properties of Steel Sheet | | | | | | | |
|---|---|---|---|---|---|---|---|---|---|---|
| Example | Steel | Hot-Rolled Steel Sheet | Ferrite vol % | Proportion of Unrecrystallized Ferrite % | Martensite vol % | Residual Austenite vol % | Average Grain Size of Ferrite μm | Number Density of Voids having Maximum Diameter of 1.0 μm or more $10^8$ void/m² | Plated Layer | Fe Content in GA or Alloy Galvannealed Layer mass % | Note |
| 1 | A | A1 | 88 | 0 | 0 | 0 | 7.0 | 3.6 | | | Example |
| 2 | A | A1 | 91 | 0 | 0 | 0 | 8.6 | 5.0 | GA | 10.3 | Example |
| 3 | A | A1 | 74 | 0 | 0 | 0 | 6.4 | 8.2 | | | Comparative Example |
| 4 | A | A1 | 86 | 0 | 0 | 3 | 7.8 | 6.1 | | | Comparative Example |
| 5 | A | A2 | 88 | 0 | 0 | 0 | 10.1 | 6.7 | | | Example |
| 6 | A | A2 | 90 | 0 | 0 | 0 | 8.8 | 16.0 | | | Comparative Example |
| 7 | A | A3 | 90 | 0 | 0 | 0 | 7.5 | 14.5 | | | Comparative Example |
| 8 | A | A4 | 87 | 0 | 0 | 0 | 13.9 | 28.0 | | | Comparative Example |
| 9 | B | B1 | 95 | 0 | 0 | 0 | 8.3 | 4.4 | GI | 1.4 | Example |
| 10 | B | B2 | 95 | 0 | 0 | 0 | 11.2 | 17.1 | | | Comparative Example |
| 11 | B | B3 | 90 | 0 | 0 | 0 | 7.8 | 7.6 | | | Example |
| 12 | C | C1 | 81 | 0 | 0 | 1 | 8.2 | 3.8 | EG | | Example |
| 13 | C | C1 | 89 | 0 | 4 | 1 | 10.4 | 9.1 | | | Comparative Example |
| 14 | C | C2 | 84 | 0 | 0 | 0 | 8.7 | 7.1 | | | Example |
| 15 | C | C3 | 83 | 0 | 0 | 0 | 7.7 | 20.0 | | | Comparative Example |

TABLE 4-1-continued

| | | | | Properties of Steel Sheet | | | | | | |
|---|---|---|---|---|---|---|---|---|---|---|
| Example | Steel | Hot-Rolled Steel Sheet | Ferrite vol % | Proportion of Unrecrystallized Ferrite % | Martensite vol % | Residual Austenite vol % | Average Grain Size of Ferrite μm | Number Density of Voids having Maximum Diameter of 1.0 μm or more $10^8$ void/m² | Plated Layer | Fe Content in GA or Alloy Galvannealed Layer mass % | Note |
| 16 | D | D | 82 | 0 | 1 | 0 | 8.7 | 6.0 | Deposited | | Example |
| 17 | E | E | 85 | 0 | 0 | 0 | 10.3 | 0.0 | | | Example |
| 18 | F | F1 | 83 | 0 | 0 | 0 | 8.9 | 3.9 | GA | 9.0 | Example |
| 19 | F | F1 | 84 | 0 | 0 | 1 | 9.4 | 2.0 | | | Example |
| 20 | F | F2 | 86 | 0 | 0 | 0 | 11.5 | 5.0 | | | Example |
| <u>21</u> | F | <u>F3</u> | 85 | 0 | 0 | 0 | 9.6 | <u>13.7</u> | | | Comparative Example |
| 22 | G | G | 85 | 0 | 0 | 0 | 8.9 | 4.5 | Deposited | | Example |
| 23 | H | H | 81 | 0 | 0 | 0 | 12.6 | 1.8 | | | Example |
| 24 | I | I | 85 | 2 | 0 | 0 | 6.3 | 3.0 | EG | | Example |
| 25 | J | J | 82 | 0 | 0 | 0 | 8.7 | 2.7 | | | Example |
| 26 | K | K1 | 83 | 0 | 0 | 1 | 6.3 | 6.0 | GI | 0.4 | Example |
| <u>27</u> | K | K1 | 98 | 0 | 0 | 0 | 8.3 | <u>12.6</u> | | | Comparative Example |
| 28 | K | K2 | 88 | 0 | 0 | 0 | 13.0 | 5.6 | | | Example |
| <u>29</u> | K | <u>K3</u> | 83 | 0 | 0 | 0 | 13.0 | <u>12.0</u> | | | Comparative Example |
| 30 | L | L | 81 | 0 | 0 | 1 | 14.0 | 4.5 | GA | 12.0 | Example |

The underline represents that the value is outside of the range of the present invention.

TABLE 4-2

| | | | | Properties of Steel Sheet | | | | | | |
|---|---|---|---|---|---|---|---|---|---|---|
| Example | Steel | Hot-Rolled Steel Sheet | Ferrite vol % | Proportion of Unrecrystallized Ferrite % | Martensite vol % | Residual Austenite vol % | Average Grain Size of Ferrite μm | Number Density of Voids having Maximum Diameter of 1.0 μm or more $10^8$ void/m² | Plated Layer | Fe Content in GA or Alloy Galvannealed Layer mass % | Note |
| 31 | M | M | 91 | 0 | 0 | 0 | 8.4 | 3.8 | | | Example |
| 32 | N | N | 80 | 0 | 1 | 0 | 8.9 | 9.2 | GI | 0.9 | Example |
| 33 | O | O | 83 | 0 | 0 | 0 | 15.2 | 2.6 | Zn Alloy Plated | | Example |
| 34 | P | P1 | 86 | 0 | 1 | 0 | 9.0 | 4.3 | Alloy Galvannealed | 10.0 | Example |
| <u>35</u> | P | P1 | 88 | <u>24</u> | 0 | 0 | 7.9 | 4.0 | | | Comparative Example |
| 36 | P | P2 | 83 | 0 | 0 | 1 | 11.6 | 6.1 | | | Example |
| <u>37</u> | P | P2 | 83 | <u>25</u> | 0 | 0 | 16.2 | 7.0 | | | Comparative Example |
| <u>38</u> | P | <u>P3</u> | 84 | 0 | 0 | 0 | 8.0 | <u>16.9</u> | | | Comparative Example |
| <u>39</u> | P | <u>P4</u> | 85 | 0 | 0 | 0 | 8.6 | <u>18.0</u> | | | Comparative Example |
| 40 | Q | Q | 89 | 3 | 0 | 0 | 8.6 | 6.0 | Alloy Galvannealed | 8.6 | Example |
| 41 | R | R | 84 | 3 | 0 | 0 | 6.7 | 8.0 | | | Example |
| 42 | S | S | 92 | 0 | 0 | 0 | 12.4 | 2.7 | GI | 0.3 | Example |
| 43 | T | T | 82 | 0 | 0 | 0 | 10.3 | 1.0 | | | Example |
| 44 | U | U | 81 | 0 | 0 | 0 | 10.9 | 3.5 | EG | | Example |
| 45 | V | V | 84 | 0 | 0 | 0 | 8.3 | 2.4 | | | Example |
| 46 | W | W1 | 90 | 0 | 0 | 0 | 7.9 | 8.2 | GA | 8.2 | Example |
| <u>47</u> | W | W1 | 86 | 0 | 0 | 0 | 7.6 | <u>14.0</u> | | | Comparative Example |
| 48 | W | W2 | 83 | 0 | 1 | 0 | 8.9 | 7.1 | | | Example |
| <u>49</u> | W | <u>W3</u> | 89 | 0 | 0 | 0 | 10.1 | <u>11.6</u> | | | Comparative Example |
| <u>50</u> | W | <u>W4</u> | 89 | 0 | 0 | 0 | 9.0 | <u>16.6</u> | | | Comparative Example |

TABLE 4-2-continued

Properties of Steel Sheet

| Example | Steel | Hot-Rolled Steel Sheet | Ferrite vol % | Proportion of Unrecrystallized Ferrite % | Martensite vol % | Residual Austenite vol % | Average Grain Size of Ferrite μm | Number Density of Voids having Maximum Diameter of 1.0 μm or more $10^8$ void/m² | Plated Layer | Fe Content in GA or Alloy Galvannealed Layer mass % | Note |
|---|---|---|---|---|---|---|---|---|---|---|---|
| 51 | X | X | 85 | 2 | 0 | 0 | 12.5 | 3.0 | | | Example |
| 52 | Y | Y | 81 | 0 | 0 | 0 | 14.9 | 2.5 | Zn Alloy Plated | | Example |
| 53 | Z | Z | 86 | 0 | 0 | 0 | 8.5 | 7.8 | | | Example |
| 54 | AA | AA | 100 | 0 | 0 | 0 | 9.5 | 0.0 | | | Comparative Example |
| 55 | AB | AB | 71 | 0 | 0 | 0 | 8.0 | 13.0 | | | Comparative Example |
| 56 | AC | AC | 83 | 0 | 1 | 3 | 11.2 | 8.0 | | | Comparative Example |
| 57 | AD | AD | 68 | 0 | 13 | 4 | 11.8 | 25.0 | | | Comparative Example |
| 58 | A | A1 | 90 | 0 | 1 | 0 | 8.3 | 12.0 | | | Comparative Example |
| 59 | A | A1 | 90 | 18 | 0 | 0 | 7.7 | 5.0 | | | Comparative Example |

The underline represents that the value is outside of the range of the present invention.

TABLE 5-1

| Example | Steel | Hot-Rolled Steel Sheet | Properties | | | | | | Transition Temperature ° C. | Note |
|---|---|---|---|---|---|---|---|---|---|---|
| | | | YS MPa | TS MPa | uEl % | σ1 MPa | σ2 MPa | σ2/σ1 | | |
| 1 | A | A1 | 215 | 408 | 18 | 388 | 147 | 0.38 | −80 | Example |
| 2 | A | A1 | 210 | 392 | 20 | 378 | 183 | 0.48 | −80 | Example |
| 3 | A | A1 | 227 | 479 | 14 | 467 | 268 | 0.57 | −80 | Comparative Example |
| 4 | A | A1 | 254 | 437 | 18 | 422 | 222 | 0.53 | −20 | Comparative Example |
| 5 | A | A2 | 246 | 412 | 20 | 391 | 229 | 0.59 | −80 | Example |
| 6 | A | A2 | 206 | 410 | 21 | 396 | 305 | 0.77 | −80 | Comparative Example |
| 7 | A | A3 | 239 | 388 | 20 | 369 | 265 | 0.72 | −80 | Comparative Example |
| 8 | A | A4 | 212 | 408 | 20 | 390 | 380 | 0.97 | −80 | Comparative Example |
| 9 | B | B1 | 229 | 366 | 22 | 351 | 150 | 0.43 | −100 | Example |
| 10 | B | B2 | 227 | 366 | 23 | 349 | 278 | 0.80 | −60 | Comparative Example |
| 11 | B | B3 | 217 | 393 | 19 | 374 | 211 | 0.56 | −100 | Example |
| 12 | C | C1 | 276 | 489 | 16 | 464 | 219 | 0.47 | −60 | Example |
| 13 | C | C1 | 278 | 499 | 20 | 486 | 302 | 0.62 | −20 | Comparative Example |
| 14 | C | C2 | 250 | 435 | 17 | 413 | 180 | 0.44 | −80 | Example |
| 15 | C | C3 | 269 | 440 | 16 | 425 | 306 | 0.72 | −40 | Comparative Example |
| 16 | D | D | 220 | 439 | 18 | 428 | 193 | 0.45 | −40 | Example |
| 17 | E | E | 234 | 391 | 19 | 377 | 160 | 0.42 | −60 | Example |
| 18 | F | F1 | 281 | 454 | 18 | 435 | 208 | 0.48 | −80 | Example |
| 19 | F | F1 | 251 | 473 | 17 | 462 | 151 | 0.33 | −60 | Example |
| 20 | F | F2 | 286 | 462 | 18 | 443 | 184 | 0.42 | −80 | Example |
| 21 | F | F3 | 291 | 468 | 17 | 452 | 330 | 0.73 | −40 | Comparative Example |
| 22 | G | G | 234 | 402 | 17 | 382 | 188 | 0.49 | −100 | Example |
| 23 | H | H | 214 | 438 | 16 | 422 | 120 | 0.28 | −80 | Example |
| 24 | I | I | 268 | 449 | 18 | 430 | 175 | 0.41 | −60 | Example |
| 25 | J | J | 205 | 417 | 16 | 406 | 134 | 0.33 | −80 | Example |
| 26 | K | K1 | 268 | 474 | 16 | 464 | 209 | 0.45 | −60 | Example |
| 27 | K | K1 | 248 | 408 | 24 | 396 | 288 | 0.73 | −60 | Comparative Example |

TABLE 5-1-continued

| Example | Steel | Hot-Rolled Steel Sheet | YS MPa | TS MPa | uEl % | σ1 MPa | σ2 MPa | σ2/σ1 | Transition Temperature ° C. | Note |
|---|---|---|---|---|---|---|---|---|---|---|
| 28 | K | K2 | 281 | 442 | 19 | 423 | 189 | 0.45 | −80 | Example |
| <u>29</u> | K | <u>K3</u> | 260 | 457 | 16 | 438 | 328 | <u>0.75</u> | −80 | Comparative Example |
| 30 | L | L | 299 | 460 | 17 | 438 | 193 | 0.44 | −60 | Example |

The underline represents that the value is outside of the range of the present invention or represents undesirable properties.

TABLE 5-2

| Example | Steel | Hot-Rolled Steel Sheet | YS MPa | TS MPa | uEl % | σ1 MPa | σ2 MPa | σ2/σ1 | Transition Tmperature °C | Note |
|---|---|---|---|---|---|---|---|---|---|---|
| 31 | M | M | 277 | 411 | 21 | 397 | 175 | 0.44 | −80 | Example |
| 32 | N | N | 226 | 448 | 16 | 429 | 252 | 0.59 | −40 | Example |
| 33 | O | O | 209 | 409 | 18 | 389 | 184 | 0.47 | −80 | Example |
| 34 | P | P1 | 232 | 450 | 18 | 431 | 211 | 0.49 | −60 | Example |
| <u>35</u> | P | P1 | 325 | 442 | <u>14</u> | 424 | 220 | 0.52 | −60 | Comparative Example |
| 36 | P | P2 | 270 | 458 | 18 | 444 | 215 | 0.48 | −60 | Example |
| 37 | P | P2 | 342 | 474 | <u>12</u> | 455 | 212 | 0.47 | −80 | Comparative Example |
| <u>38</u> | P | <u>P3</u> | 263 | 437 | 17 | 426 | 302 | <u>0.71</u> | −60 | Comparative Example |
| <u>39</u> | P | <u>P4</u> | 257 | 423 | 17 | 409 | 308 | <u>0.75</u> | −60 | Comparative Example |
| 40 | Q | Q | 206 | 379 | 19 | 364 | 185 | 0.51 | −80 | Example |
| 41 | R | R | 256 | 463 | 17 | 444 | 195 | 0.44 | −80 | Example |
| 42 | S | S | 266 | 406 | 20 | 395 | 188 | 0.48 | −80 | Example |
| 43 | T | T | 236 | 458 | 18 | 440 | 157 | 0.36 | −80 | Example |
| 44 | U | U | 242 | 476 | 17 | 461 | 179 | 0.39 | −80 | Example |
| 45 | V | V | 261 | 435 | 17 | 414 | 133 | 0.32 | −80 | Example |
| 46 | W | W1 | 294 | 434 | 19 | 423 | 231 | 0.55 | −80 | Example |
| <u>47</u> | W | W1 | 265 | 475 | 18 | 464 | 333 | <u>0.72</u> | −60 | Comparative Example |
| 48 | W | W2 | 286 | 497 | 17 | 476 | 256 | 0.54 | −60 | Example |
| <u>49</u> | W | <u>W3</u> | 272 | 418 | 20 | 407 | 295 | <u>0.72</u> | −80 | Comparative Example |
| <u>50</u> | W | <u>W4</u> | 270 | 426 | 18 | 413 | 321 | <u>0.78</u> | −60 | Comparative Example |
| 51 | X | X | 284 | 460 | 19 | 439 | 165 | 0.38 | −100 | Example |
| 52 | Y | Y | 199 | 443 | 16 | 421 | 169 | 0.40 | −80 | Example |
| 53 | Z | Z | 204 | 390 | 19 | 375 | 173 | 0.46 | −80 | Example |
| <u>54</u> | <u>AA</u> | <u>AA</u> | 179 | <u>314</u> | 24 | 349 | 99 | 0.28 | −120 | Comparative Example |
| <u>55</u> | <u>AB</u> | <u>AB</u> | 268 | 519 | <u>13</u> | 500 | 354 | <u>0.71</u> | −80 | Comparative Example |
| <u>56</u> | <u>AC</u> | <u>AC</u> | 321 | 566 | 17 | 547 | 257 | 0.47 | <u>20</u> | Comparative Example |
| <u>57</u> | <u>AD</u> | <u>AD</u> | 412 | 779 | <u>12</u> | 748 | 663 | <u>0.89</u> | <u>280</u> | Comparative Example |
| <u>58</u> | A | A1 | 206 | 394 | 16 | 367 | 274 | <u>0.75</u> | −60 | Comparative Example |
| <u>59</u> | A | A1 | 285 | 424 | <u>14</u> | 408 | 205 | 0.50 | −60 | Comparative Example |

The underline represents that the value is outside of the range of the present invention or represents undesirable properties.

Among steels A to AD shown in Table 1, the steels AA to AD are comparative examples where the composition was outside of the range defined by the present invention.

In the steel AA, the C content was lower than the range of the present invention. In the steel sheet according to Experiment Example 54 obtained using this steel, the maximum tensile strength was low.

In the steel AB, the C content was higher than the range of the present invention. In the steel sheet according to Experiment Example 55 obtained using this steel, the amount of ferrite was small, and the number density of voids was high. Therefore, the uniform elongation was low, and σ2/σ1 was high.

In the steel AC, the Si content was higher than the range of the present invention. In the steel sheet according to Experiment Example 56 obtained using this steel, the amount of residual austenite was large, and the ductile-brittle transition temperature was high.

In the steel AD, the Mn content was higher than the range of the present invention. In the steel sheet according to Experiment Example 57 obtained using this steel, the amount of ferrite was small, the amounts of martensite and residual austenite were large, and the number density of voids was high. Therefore, the uniform elongation was low, and σ2/σ1 and the ductile-brittle transition temperature were high.

Experiment Examples 7, 15, 21, 29, 39, 49, and 50 were comparative examples where the conditions of the hot rolling process were outside of the range of the present invention.

Experiment Example 7 was a comparative example in which $D_n$ was high and Expression (1) in the temperature range of 1000° C. or lower was not satisfied. Therefore, the number density of voids was high, and σ2/σ1 was high.

Experiment Example 15 was a comparative example in which the steel piece heating temperature was low. Therefore, the number density of voids was high, and σ2/σ1 was high.

Experiment Example 21 was a comparative example in which the average cooling rate in the temperature range of the cooling start temperature to 500° C. was low. Therefore, the number density of voids was high, and σ2/σ1 was high.

Experiment Example 29 was a comparative example in which the hot rolling completion temperature was low. Therefore, the number density of voids was high, and σ2/σ1 was high.

Experiment Example 39 was a comparative example in which the time required for the start of cooling after completion of hot rolling was short. Therefore, the number density of voids was high, and σ2/σ1 was high.

Experiment Example 49 was a comparative example in which the hot rolling completion temperature was high. Therefore, the number density of voids was high, and σ2/σ1 was high.

Experiment Example 50 was a comparative example in which the steel piece heating temperature was high. Therefore, the number density of voids was high, and σ2/σ1 was high.

Experiment Examples 8, 10, and 38 were comparative examples in which the conditions of the reheating process were outside of the range of the present invention.

Experiment Example 8 was a comparative example in which the maximum reheating temperature in the reheating process was low. Therefore, the number density of voids was high, and σ2/σ1 was high.

Experiment Example 10 was a comparative example in which the maximum reheating temperature in the reheating process was high. Therefore, the number density of voids was high, and σ2/σ1 was high.

Experiment Example 38 was a comparative example in which $K_{20}$ was low and Expression (2) in the temperature range of 500° C. to 700° C. was not satisfied. Therefore, the number density of voids was high, and σ2/σ1 was high.

Experiment Examples 6, 37, 58, and 59 were comparative examples in which the conditions of the cold rolling process were outside of the range of the present invention.

Experiment Example 6 was a comparative example in which the total rolling reduction in the cold rolling process was high. Therefore, the number density of voids was high, and σ2/σ1 was high.

Experiment Example 37 was a comparative example in which the total rolling reduction in the cold rolling process was low. Therefore, an excess amount of unrecrystallized ferrite remained, and the uniform elongation was low.

Experiment Example 58 was a comparative example in which the rolling completion temperature in the cold rolling process was low. Therefore, the number density of voids was high, and σ2/σ1 was high.

Experiment Example 59 was a comparative example in which the rolling completion temperature in the cold rolling process was high. Therefore, an excess amount of unrecrystallized ferrite remained, and the uniform elongation was low.

Experiment Examples 3, 4, 13, 27, 35, and 47 were comparative examples where the conditions of the annealing process were outside of the range of the present invention.

Experiment Example 3 was a comparative example in which the annealing temperature was high. Therefore, the amount of ferrite was small, and the uniform elongation was low.

Experiment Example 27 was a comparative example in which the annealing temperature was low. Therefore, the number density of voids was high, and σ2/σ1 was high.

Experiment Example 4 was a comparative example in which the value of the middle side of Expression (3) was high. Therefore, the amount of residual austenite was large, and the ductile-brittle transition temperature was high.

Experiment Example 13 was a comparative example in which the value of the left side of Expression (4) was low. Therefore, the amount of martensite was large, and the ductile-brittle transition temperature was high.

Experiment Example 35 was a comparative example in which the value of the middle side of Expression (3) was low. Therefore, an excess amount of unrecrystallized ferrite remained, and the uniform elongation was low.

Experiment Example 47 was a comparative example in which the tension applied in the temperature range of 720° C. to the annealing temperature was low. Therefore, the number density of voids was high, and σ2/σ1 was high.

Experiment Examples other than Comparative Examples described above were Examples according to the present invention. It was found that the steel sheets described as Examples were manufactured using the manufacturing method satisfying the manufacturing conditions according to the present invention and thus had excellent formability, strength, and resistance to impact and fracture.

Experiment Examples 2, 9, 12, 16, 18, 22, 24, 26, 30, 32, 33, 34, 40, 42, 44, 46, and 52 are examples where the plated steel sheets according to the present invention were obtained by performing plating.

Experiment Examples 9, 26, 32, and 42 were Examples in which a hot-dip galvanized steel sheet (GI) was obtained by cooling the steel sheet to 500° C. in the annealing process, dipping the steel sheet in a molten zinc bath, and cooling the steel sheet to room temperature.

Experiment Examples 2, 18, 30, and 46 were Examples in which hot-dip galvannealed steel sheet (GA) was obtained by cooling the steel sheet to 500° C. in the annealing process, dipping the steel sheet in a molten zinc bath and reheating the steel sheet to 560° C. for alloying and cooling the steel sheet to room temperature.

Experiment Examples 33 and 52 were Examples in which a zinc alloy plated steel sheet was obtained by cooling the steel sheet to 500° C. in the annealing process, dipping the steel sheet in a molten zinc alloy bath, and cooling the steel sheet to room temperature.

Experiment Examples 34 and 40 were Examples in which an alloy galvannealed steel sheet was obtained by cooling the steel sheet to 500° C. in the annealing process, dipping the steel sheet in a molten zinc alloy bath and reheating the steel sheet to 580° C. for alloying and cooling the steel sheet to room temperature.

Experiment Examples 16 and 22 were Examples in which a galvanized steel sheet was obtained by performing deposition plating in the annealing process before temper rolling.

Experiment Examples 12, 24, and 44 were Examples in which an electrogalvanized steel sheet (EG) was obtained by performing electrogalvanizing after the annealing process.

INDUSTRIAL APPLICABILITY

As described above, according to the present invention, a high strength steel sheet having excellent formability, resistance to impact and fracture, and toughness can be provided. The steel sheet according to the present invention is a steel sheet that is suitable for a significant reduction in the weight of a vehicle and for ensuring the protection and safety of a passenger. Therefore, the present invention is highly applicable to the steel sheet manufacturing industry and the automobile industry.

The invention claimed is:

1. A steel sheet comprising, as a composition, by mass %:
C: 0.010% to 0.200%;
Si: 0.005% to 1.500%;
Mn: 0.05% to 3.00%;
Al: 0.005% to 1.000%;
P: 0.100% or less;
S: 0.0200% or less;
N: 0.0150% or less;
O: 0.0100% or less;
Nb: 0% to 0.060%;
Ti: 0% to 0.100%;
V: 0% to 0.500%;
Cr: 0% to 1.00%;
Ni: 0% to 1.00%;
Cu: 0% to 1.00%;
Mo: 0% to 1.00%;
W: 0% to 1.000%;
B: 0% to 0.0100%;
Sn: 0% to 1.00%;
Sb: 0% to 0.20%;
one or two or more selected from the group of Ca, Ce, Mg, Zr, La, and REM:
0% to 0.0100% in total; and
a remainder including Fe and impurities,
wherein a microstructure at a ¼ thickness position from a surface in a sheet thickness direction includes, by vol %, ferrite: 80% or more, martensite: 2% or less, and residual austenite: 2% or less,
has a proportion of unrecrystallized ferrite in the ferrite of 5% or less, and
in the microstructure of the steel sheet stretched by 10% at the ¼ thickness position from the surface in the sheet thickness direction, a number density of voids having a maximum diameter of 1.0 μm or more is $1.0 \times 10^9$ pieces/m$^2$ or less.

2. The steel sheet according to claim 1,
wherein the composition further includes, by mass %, one or two or more selected from the group of:
Nb: 0.005% to 0.060%;
$T_i$: 0.015% to 0.100%;
V: 0.010% to 0.500%;
Cr: 0.05% to 1.00%;
Ni: 0.05% to 1.00%;
Cu: 0.05% to 1.00%;
Mo: 0.03% to 1.00%;
W: 0.030% to 1.000%;
B: 0.0005% to 0.0100%;
Sn: 0.01% to 1.00%;
Sb: 0.005% to 0.20%; and
one or two or more selected from the group of Ca, Ce, Mg, Zr, La, and REM: 0.0001% to 0.0100% in total.

3. The steel sheet according to claim 1,
wherein an average grain size of the ferrite in the microstructure is 6.0 μm to 15.0 μm.

4. The steel sheet according to claim 1, comprising a galvanized layer on the surface.

5. The steel sheet according to claim 1, comprising a zinc alloy plated layer on the surface.

6. The steel sheet according to claim 4,
wherein a Fe content in the galvanized layer or the zinc alloy plated layer is 7.0% to 13.0% by mass %.

* * * * *